United States Patent
Bratton et al.

(10) Patent No.: US 9,167,213 B2
(45) Date of Patent: *Oct. 20, 2015

(54) APPARATUS AND METHOD FOR VIDEO DISPLAY AND CONTROL FOR PORTABLE DEVICE

(71) Applicants: Raymond Alex Bratton, Woodridge, IL (US); Nathan Robbins Petersen, Lisle, IL (US)

(72) Inventors: Raymond Alex Bratton, Woodridge, IL (US); Nathan Robbins Petersen, Lisle, IL (US)

(73) Assignee: Lextech Labs LLC, Lisle, IL (US)

( * ) Notice: Subject to any disclaimer, the term of this patent is extended or adjusted under 35 U.S.C. 154(b) by 237 days.

This patent is subject to a terminal disclaimer.

(21) Appl. No.: 13/679,166

(22) Filed: Nov. 16, 2012

(65) Prior Publication Data

US 2013/0076908 A1    Mar. 28, 2013

Related U.S. Application Data

(63) Continuation of application No. 12/471,584, filed on May 26, 2009, now Pat. No. 8,340,654.

(51) Int. Cl.
*H04M 3/00* (2006.01)
*H04N 7/18* (2006.01)
*H04N 5/232* (2006.01)
*H04N 21/218* (2011.01)
*H04N 21/2668* (2011.01)
*H04N 21/4227* (2011.01)
*H04M 1/725* (2006.01)
*H04N 21/414* (2011.01)

(52) U.S. Cl.
CPC ............ *H04N 7/181* (2013.01); *H04N 5/232* (2013.01); *H04N 5/23293* (2013.01); *H04N 7/185* (2013.01); *H04N 21/21805* (2013.01); *H04N 21/2668* (2013.01); *H04N 21/4227* (2013.01); *H04M 1/72533* (2013.01); *H04M 2250/22* (2013.01); *H04N 21/41407* (2013.01)

(58) Field of Classification Search
CPC ................... H04M 1/72533; H04M 2250/22; H04N 21/21805; H04N 21/2668; H04N 21/41407; H04N 21/4227; H04N 5/232; H04N 5/23293; H04N 7/181; H04N 7/185
USPC ............... 455/420, 457, 550.1, 422.1, 412.2; 348/159
See application file for complete search history.

(56) References Cited

U.S. PATENT DOCUMENTS

| | | | | |
|---|---|---|---|---|
| 6,101,536 A * | 8/2000 | Kotani | ............ | H04N 7/181 348/143 |
| 7,508,418 B2 * | 3/2009 | Renkis | ............ | H04N 5/23203 348/211.2 |
| 7,679,649 B2 * | 3/2010 | Ralston | ............ | H03M 7/40 348/207.1 |
| 2002/0180579 A1 * | 12/2002 | Nagaoka et al. | ............ | 340/3.1 |

* cited by examiner

*Primary Examiner* — Babar Sarwar
(74) *Attorney, Agent, or Firm* — Schiff Hardin LLP

(57) ABSTRACT

An apparatus and method for display and control of video data on a mobile device provides simultaneous multiple video data display of groups of video sources and selection of video data for single, larger viewing. Control of the camera source of the video data is provided for the mobile device user, such as by manipulation of a multi-touch sensitive screen to pan, tilt and zoom. Image capture from the video screen and marking of the captured image is provided. Activation of video data streams and groups of video data streams for display on the mobile device is provided by transfer of activation information to the mobile device via email. Notification of events monitored by the video source or by other sensors is sent to users of the mobile devices.

21 Claims, 23 Drawing Sheets

APPARATUS AND METHOD FOR VIDEO DISPLAY AND CONTROL FOR PORTABLE DEVICE

CROSS-REFERENCE TO RELATED APPLICATIONS

This application is a continuation application of U.S. Utility patent application Ser. No. 12/471,584, filed May 26, 2009.

BACKGROUND OF THE INVENTION

1. Field of the Invention

The present invention relates generally to an apparatus and to a method for display of video information on a portable device and for control of the displayed video.

2. Description of the Related Art

Security cameras are being increasingly used in a wide variety of places. Typically, one or more security cameras are connected as part of a security system. A centralized office is provided with one or more display devices on which is displayed the video feed from the security cameras. One or more persons at the centralized office views the video feed from the cameras on the display devices and selects which of the video feeds are displayed.

Police officers, firefighters, security personnel, and other emergency responders or first responders at or traveling to a location being monitored by security cameras do not see the video information captured by the security cameras. The emergency responder is therefore unaware of activities at the location that may be revealed by the security camera.

SUMMARY OF THE INVENTION

The present invention provides an apparatus and method for display of video signals from a video camera on a display screen of a portable electronic device. The portable electronic device is connected via a wireless network to receive the video signals. An emergency responder and other person may view the video feed from one or more video cameras on a portable device carried by the person. The portable device is preferably able to receive and display multiple video signals for simultaneous and/or serial display on the portable device. Control of the video signals is preferably by manipulation of the touch screen of the portable device.

In one embodiment, the portable electronic device is configured to receive the video signals via configuration data forwarded wirelessly to the portable device. The wireless transmission of the configuration data enables persons who may be away from a docking station to add the capability to view a set of video signals.

DETAILED DESCRIPTION OF THE PREFERRED EMBODIMENTS

Figure 1:
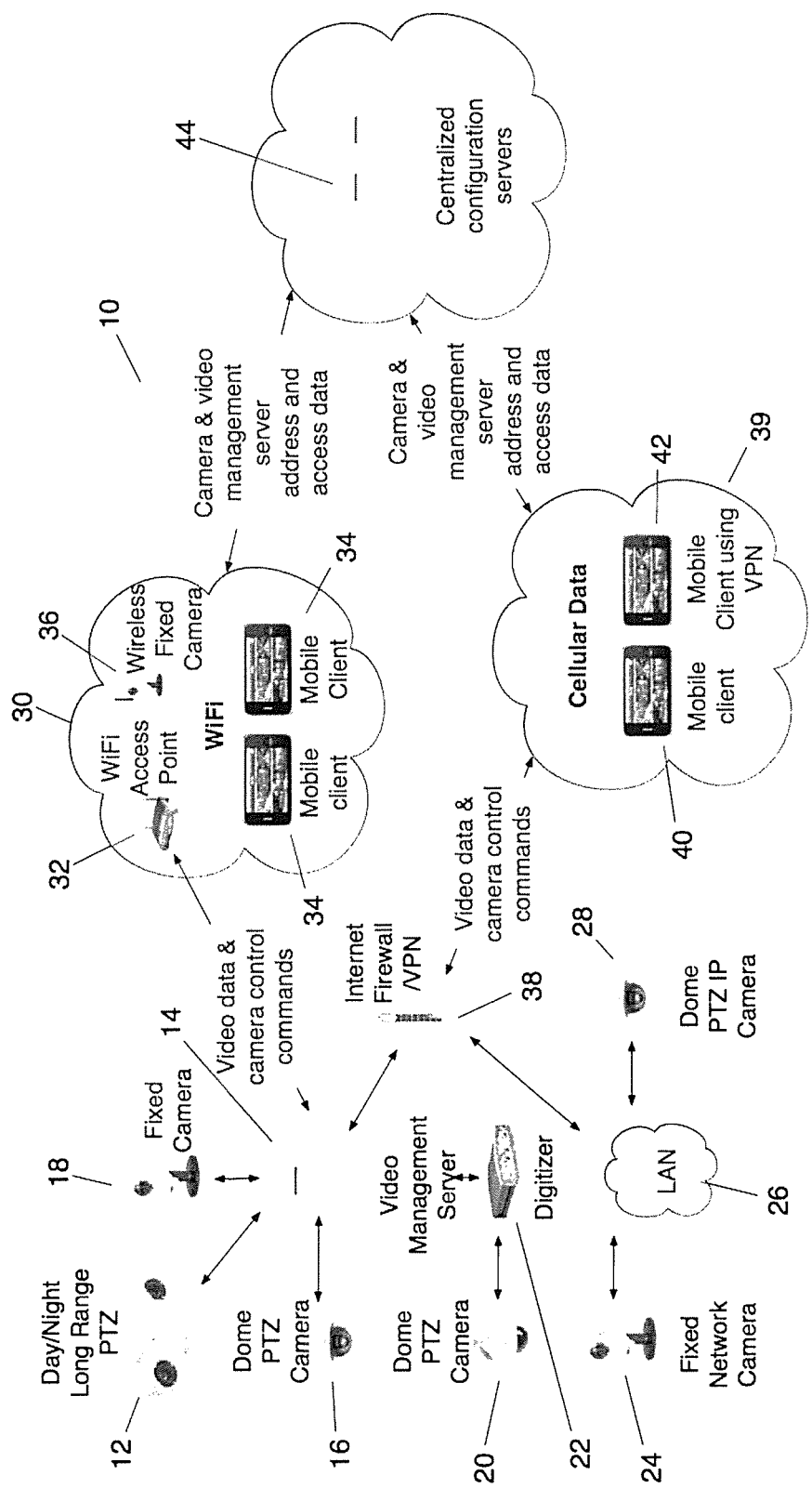
FIG. 1 is an overall system diagram of a mobile video monitoring system according to the principles of the present invention.

Referring first to FIG. 1, a system diagram 10 according to an embodiment of the present invention. The system 10 includes at least one camera for capturing video images or still images, or both. The camera can be any of a variety of different types of cameras. In FIG. 1 is shown examples of cameras, some or all of which may be used in the system 10. A day/night long range pan, tilt, zoom (PTZ) camera 12 is connected to a video management server 14. Other possible cameras include a dome pan, tilt, zoom (PTZ) camera 16 and a fixed camera 18, which are likewise shown connected to the video management server 14. The cameras 12, 16 and 18 generate digital video signals which are managed by the video management server 14.

It is possible to use analog cameras with the present system as well. For example, an analog camera 20, which in the illustration is an analog dome pan, tilt, zoom camera, may be used with the present system. The signal from the analog camera 20 is fed to a digitizer 22 which receives the analog video signal and generates still digital images that are stored as a digital video file. The digitizer 22 is also referred to as a video digitizer or a frame grabber. The output of the digitizer 22 is supplied to the video management server 14 as a digital signal.

Another possible source of the video signal is a fixed network camera 24. A network camera 24, whether fixed or otherwise, is connected to a network 26, shown here as a local area network (LAN). It is also possible to use a camera that generates a video signal as a stream of digital packets across an Internet protocol network, for example the dome pan, tilt, zoom Internet protocol (IP) camera 28. The IP camera 28 is connected to the local area network 26.

While the foregoing describes several popular types of video cameras, this list is not intended to be exhaustive of the types of cameras with which the present invention may be used. Video cameras and still cameras of all types are within the scope of the present system. Similarly, the video management server and digitizer may be in a form different than described here, such as a video server that incorporates a digital video conversion function into the server rather than as a separate device. Such variations are encompassed here.

The video signals from the cameras are transmitted. One possible transmission path is from the video management server 14 to a wireless local area network 30, one example if which is a WiFi network. The signal from the video server 14 is transmitted to a WiFi access point 32. The wireless video signal may be detected by a mobile client device 34. The mobile client device 34 receives the video data and displays the video on a display screen. In addition to displaying the video output from the cameras, the mobile client device 34 also controls the cameras. As such, the mobile client device 34 transmits camera control commands over the wireless network 30 to the access point 32, which in turn transmits the commands to the video server 14 and to the respective camera. Two mobile client devices 34 are shown.

The wireless local network 30 may include its own camera, such as the wireless fixed camera 36. The wireless camera 36 utilizes the wireless network 30 rather than requiring the video management server 14 for transmission of the video signal. Both video data and camera commands are carried over the wireless network 30.

Another transmission path for the video signals is via an internet firewall or virtual private network (VPN) 38 that receives the video signal from the video management server 14 and/or the local area network 26. Video data is transmitted to a cellular data network 38, one example of which is a 3G network and another example is the EDGE network. The cellular data network 38 transmits the video data to a mobile client 40 for display on the display screen of the mobile device. Camera control commands are sent by the mobile client 40 over the cellular data network 38 to the internet firewall 38 and to the video server 14 for transmission to the respective cameras. A mobile client 42 using virtual private network is similarly provided with video data and with the means for communicating camera commands. Other wired and wireless communications to the mobile client are also possible, including for example Bluetooth wireless communications.

Camera and video management server address and access data are provided to the network 30 or the network 38 by centralized configuration servers 44. In the preferred embodiment, these servers provide a multi-server hosted system running the backend software the carries out the functions described herein. Desktop computers, workstations, laptop computers and the like may be connected to the configuration servers 44 and/or to the wireless network to provide a user interface, for example.

The mobile clients 34, 40 and 42 shown in the drawing may all be the same type of device exploiting different respective capabilities or may be different devices with different communication capabilities. For simplifying the following disclosure, the mobile client 34 will be referenced, but such discussion refers to any of the mobile client devices 34, 40 or 42. The present method and apparatus also encompasses fixed or stationary client devices, such as workstations, home or office computers, laptop computers, and other such devices.

Additional security sensors and other sensors may be utilized with the present system, including motion sensors, proximity sensors, pressure sensors, door or window opening sensors, and the like. Information concerning these additional sensors may be passed through the present system, or may be used to trigger movement of a camera, transmission of data, recording of a data stream, or some other activity or event.

Figure 2:
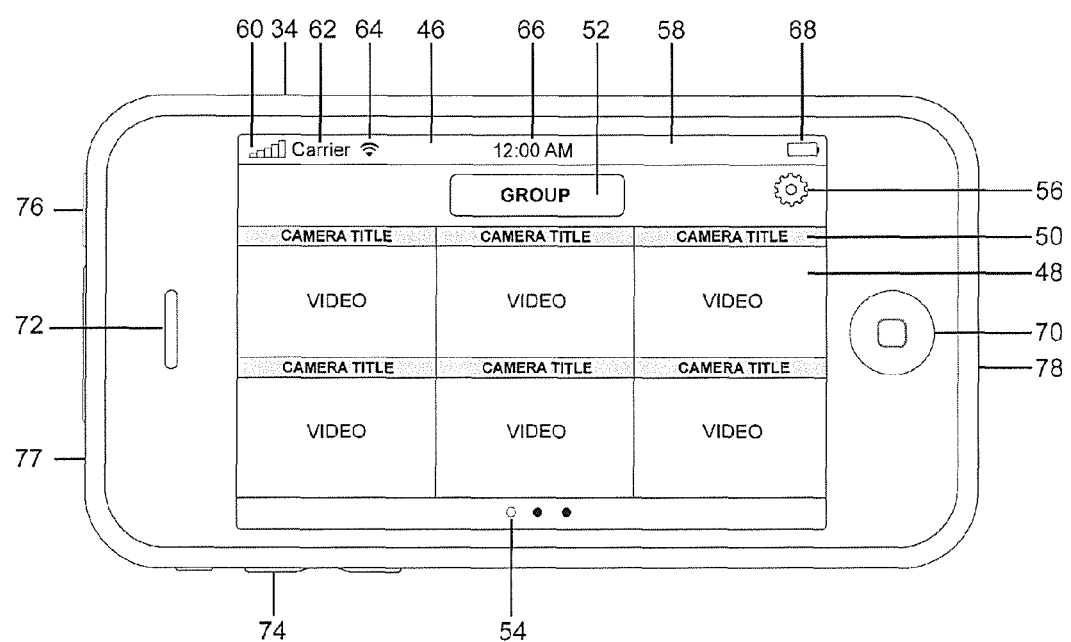
FIG. 2 is a top plan view of a mobile device having a display screen on which is displayed six simultaneous views of video data.

In FIG. 2, an example of the mobile client 34 utilized with the present method and system is an iPhone mobile communication device by Apple Inc. The iPhone is a type of a smart phone, a mobile telephone with advanced personal computer like functionalities. The iPhone functions as a mobile telephone with text messaging and visual voicemail capabilities, a camera, a portable media player, an Internet client with email and web browsing capabilities, and local Wi-Fi connectivity. The iPhone is capable of communicating over quad-band GSM and EDGE networks as well as UMTS (Univeral mobile telecommunications system), a third generation (3G) mobile telecommunications technology. Another possible mobile client is the iPod Touch, also by Apple Inc., which is portable media player and Wi-Fi wireless mobile platform, but lacks the mobile telephone function of the iPhone. Other smart phones and other mobile devices as are available or which become available are within the scope of the present invention.

The mobile client 34 operates using an operating system or OS which supports various applications that provide the functionality to the mobile client. Some functionality is built into the operation system, some functionality is provided by applications provided with the mobile device, and other functionality is provided by one or more applications that are added by the user. In one example, the present mobile device 34 obtains the application software, referred to generally as a video command application, that enables the mobile device 34 to perform the steps according to the present method from a download source, such as from an on-line application source accessible via the World Wide Web of the Internet. The application may be downloaded directly to the mobile client 34 or may be downloaded to a computer and then transferred from the computer to the mobile client 34 via a communication link, such as via a USB (universal serial bus) connected cable to a synchronization port on the mobile device 34. Another possible means for adding the application, or other data, to the mobile client 34 is by inserting a memory card containing a copy of the application. It is also foreseen that the mobile device may include the video command application when the mobile device is provided to the user.

In one embodiment, the video command application is available for download at a World Wide Web site to a desktop computer and is transferred, or synced, to the iPhone or iTouch device using the iTunes software by Apple Inc. Alternately, the video command application is downloaded directly to the iPhone or iTouch device using the App Store application on the mobile device. If a Blackberry wireless device is used as the mobile client 34, a similar application download service called App World may be used to obtain the video command application. A further possible platform is the Palm Pre smart phone that also uses a multi-touch screen.

The video command application appears as an icon (one of many) on the display of the mobile client, as is well known, and the application is run by selection of the icon, such as by tapping on the display 46 of the mobile client 34 or clicking with a pointer device. Other means of activating the video command application are also encompassed here.

The mobile client 34 of the preferred embodiment includes a multi-touch graphical user interface 46 as the primary user interface with the device. This touch screen enables the user to interact with the video command application on the mobile client 34 via both a single touch or contact with the display surface and to utilize two or more simultaneous contacts with the surface. For instance, images on the display may be zoomed to larger or smaller display sizes using a two finger "pinch" motion on touch sensitive display. Additional touch functionality will be described later.

The interface 46 is shown in FIG. 2 is partitioned to provide six video display fields 48 that display live video data from six different video cameras. Each of the six video display fields 48 includes an identifier label 50 that permits the viewer to identify the camera providing the respective video data. Video data from six cameras is forwarded to the mobile client 34 via the system shown in FIG. 1 and is displayed at a reduced size on the mobile client. The display fields 48 are arranged in a grid of three wide and two high with the graphical user interface 46 positioned in a landscape orientation. The user is thereby able to simultaneously view the live video feed from the six cameras.

The video data has been grouped by the user into a group, identified here by a button shaped graphical element 52 that is provided with the name assigned to the group. The illustrated example displays the group named "traffic feeds," indicating to the user that the video signals show roadway traffic. Fewer or more than six video data feeds may be included in each group, and more than one group may be set up on the mobile client 34. The user may select the caption or label 50 for each video field 48 and for each group 52, for example using the text input capability of the mobile client 34.

The graphical user interface 46 includes an indicator 54 that additional video fields 48 are included in the group labeled "traffic fields" 52. The indicator 54 here includes three dots, the left-most of which is brighter, indicating that the display shows the six left-most video fields 48 of the group as a page and that two additional pages of video fields 48 are included in the group. A scrolling or paging function of the mobile client permits the user to move the displayed fields for viewing of the additional members of the group 52. The additional members of the group 52 may be displayed page-by-page with six video feeds on each page, or may be displayed with portions of one page and portions of another page on screen at the same time. The user may view the additional members of the group 52 by swiping a finger or stylus horizontally across the touch sensitive display screen 46 from right to left, which causes the video fields 48 to scroll off screen to the left and new video fields to scroll on screen from the right. This function may be referred to as flipping pages. Such scrolling or page flipping permits the user to view all of the video feeds in the group. By sliding a finger or stylus across the screen from left to right, page flipping or scrolling is performed in the opposite direction. When the right-most video fields 48 are shown, the right-most dot 54 is brighter, and when a middle page of the group 52 is displayed then the middle dot 54 is brighter. The number of dots 54 provides an indication of the number of pages in the group to the user and which page of the group is being displayed.

According to the present method, the video fields 48 of video data that are included in the group 52 but that are not currently being displayed are updated periodically in the background. In the example of FIG. 2, video fields 48 on the non-displayed pages are refreshed so that when the user performs the page flipping function to the other pages recent video data is presented in the respective video fields. This prevents the display of blank fields or out-of-date images during page flipping and provides the user with the feel that live video feeds are being flipped. The periodic update of the off-screen fields 48 is at a reduced refresh frequency compared to the live video. The off-screen refresh rate may be dependent on connection capacity, for example.

In one embodiment, the refresh rate for the off-screen video fields is once every ten seconds, which keeps bandwidth usage for the off-screen refresh function low. The off-screen video fields are refreshed one image at a time in sequence, rather than all at once, so that bandwidth usage is steady rather than subject to bursts of data. A single still image is obtained for each video field refresh.

The display on the interface 46 also includes a gear icon 56 that is selected for setup and option selections, in other words the settings screen. A title bar 58 is provided on the display which shows the signal strength 60 of the wireless signal being received by the mobile client, an identification 62 of the carrier service with which the mobile client is in contact, a volume indicator 64 for the speaker, a time indicator 66, and a battery condition indicator 68. Each of these is generated by the software, either by the operating system or the video command application, or both.

The mobile device 34 of the illustrated embodiment includes a home button 70 that performs multiple functions and a speaker opening 72 for the telephone operation. Additional controls such as a volume control 74 and power button 76, headphone connector 77, a connector for battery charging docking for data transfer, as well as a microphone and camera lens (on the back surface) are provided on other surfaces of the mobile client 34.

The present method and system displays multiple video sources on the mobile client simultaneously. Different frame rates, compression and resolution settings are possible for each video feed and are accommodated by the mobile client. The mobile client 34 also accepts different types of video transport used simultaneously (for example motion jpeg server push over HTTP, XML over a TCP socket, RTSP, RDP). This makes it possible to simultaneously view video from multiple types of cameras and carried through multiple types of servers.

For video sources that support it, the video director application directs the video source to dynamically change its resolution, frame rate and compression as suitable for the display size and bandwidth available. For example, the display of a smaller size image or so-called thumbnail of the video field on the mobile device causes the video director application to request transmission of a reduced resolution video feed, whereas display of a larger image size causes the video director to request a higher resolution video feed.

Dynamic bandwidth tuning is provided based on network utilization, wherein frame rate, resolution, and compression are adjusted. Real time monitoring of the network latency over time is carried out to determine if the application's bandwidth usage is degrading the response of the network. A network ping is forwarded from the mobile client 34 to an outside server and returned to measure the latency of the connection. If the latency increases to an unacceptable degree, the video director application forwards an instruction to the connected video sources to reduce their bandwidth usage by lowering video frame rates, by increasing compression of the video data signal, or by reducing video resolution.

Measurement of the network latency can be turned on or off per network type (for example for WiFi or cellular networks). The response to a latency increase is configurable on a per camera basis.

Figure 3:
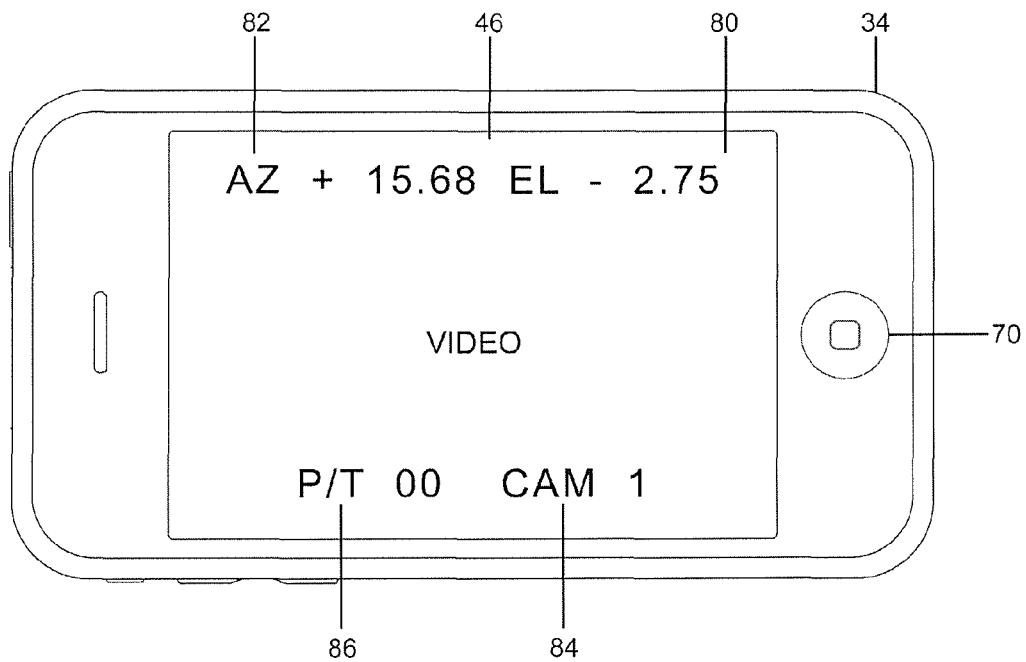
FIG. 3 is a top plan view of the mobile device of FIG. 2 on the display screen of which is shown a single video view.

Turning to FIG. 3, the mobile carrier 34 is displaying the video data from a single video camera in a full screen view 80. The full screen view 80 is presented in landscape orientation, and may be the result of a single or multiple tap on a corresponding reduced size video field of FIG. 2 or may be the result of a "pinch" zoom, where the user touches the screen with two fingers over the desired reduced size image and moves the fingers apart. Other selection means are also possible. The full screen view 80 occupies the full area of the display screen 46 of the mobile client 34. Video data having an aspect ratio differing from the display screen 46 may occupy less than the full area of the display screen, or may be zoomed or stretched to fit the full screen. The preferred Touch screen control of camera motion and zoom occurs on the full screen view 80. The orientation of the camera is indicated in text 82 overlaid on the video display. In the illustrated example, this text 82 is generated by the camera. Here, the camera is directed at azimuth +15.68 and at elevation −2.75. These direction indicators may be in degrees or some other increment. The display also includes camera generated text 84 that indicates which camera is the source of the video data, here it is camera 1, as well as a camera generated P/T function 86, which is indicated here as 00.

The user may move the camera orientation by sliding a finger or stylus on the display 46. For example, horizontal sliding movement on the display 46 causes the video command application to generate and transmit a command to the camera to perform a panning move in the corresponding horizontal direction. Vertical sliding movement on the display 46 causes the video command application to generate and transmit a command to the camera to perform a tilt movement in the corresponding vertical direction. A zoom command is generated by a two finger pinch touch on the display 46; moving the fingers apart to zoom in and moving the fingers together to zoom out. After the camera receives the move or zoom command, the camera is moved in the corresponding direction and extent.

In particular, the touch screen control of the pan, tilt and zoom camera is by touch interaction with the video image. Moving a finger to the right moves the image to the right. The camera control commands that are sent to the camera are abstracted from the touch screen finger controls so that the user is controlling the camera by the finger movements. The finger movements are received by the mobile client 34 as a collection of data points from the touch screen 46 and these are translated into discrete camera movement commands. The direction of the swipe indicates the direction of camera movement and the speed of the camera movement command is the average speed of the initial finger swipe across the touch screen 46. Movements are calculated by finger speed in pixels per second divided by specified constants dependent on camera type normalized to a value from −1 to 1 and then mapped to an appropriate speed range for the particular camera type. Longer linear finger swipe movements over the touch screen triggers the display of a user interface control over which the user can slide their finger to which causes a continuous movement of the camera at a steady speed. This applies to both pan and tilt functions of the camera. The continuous movement is stopped when the user's finger is removed from the user interface control.

Should the user desire to center the camera from a panned or tilted position, this is accomplished by performing a double tap to re-center a camera. The user double taps a single finger on the screen 46. The screen tap at the center point of the screen is passed to a camera that supports this mode of control to tell the camera to re-center its field of view on the desired coordinates. A particular advantage of this function is that in high latency wireless environments where a long lag occurs between the control command being sent and the video frame update being received, the camera may be quickly returned to a know orientation.

The touch screen control is also used to control the zoom of the camera. In the preferred embodiment using a multi-touch control screen 46, the user can control the zoom into an image by moving two fingers on the touch screen apart to "stretch" the image, which is translated into control commands to perform the physical zoom of the camera. The user can control the zoom out of an image by moving two fingers on the touch screen closer together to "pinch" the image, which controls the physical zoom out of the camera. The image displayed on the display screen 46 may be enlarged or reduced as desired. A preferred embodiment also sends a zoom command to the camera to zoom to a preset zoom level when the double tap is performed on touch screen 46. This may occur simultaneously with the re-center movement command.

Figure 4:
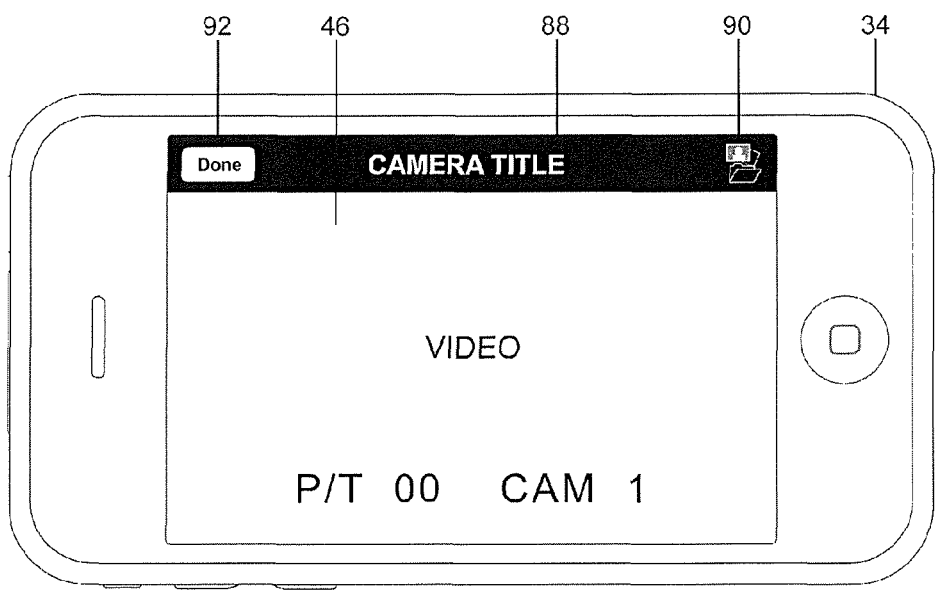
FIG. 4 is a top plan view of the mobile device with a single view of the video data and with a title bar shown.

Referring now to FIG. 4, the mobile device 34 is shown in full screen mode 80 with a view of camera 1 (CAM 1) indicated by text overlay. A title bar 88 appears at the top of the display. The title bar 88 includes a label "Chicago Traffic 4" which is the user applied label for camera 1. An icon 90 provides the function of screen capture so that by pressing the touch sensitive screen 46 a still image is captured from the current video data and stored as in the photo directory of the mobile client 34. The user is able to thereby capture the image data for use later. The still images can be viewed on the mobile client 34 or transferred to another device for use. It is also foreseen to selectively capture video sequences by user control. When the user has completed the screen capture function and wishes to return to another mode, a done control button 92 is provided.

When the still frame or snapshot of the live video feed is captured or "grabbed," a watermark is applied to the still image that is saved to device photo album, thereby enabling the image to be identified later. The frame capture of the full screen video is watermarked with a date and time stamp and the camera name.

Figure 5:
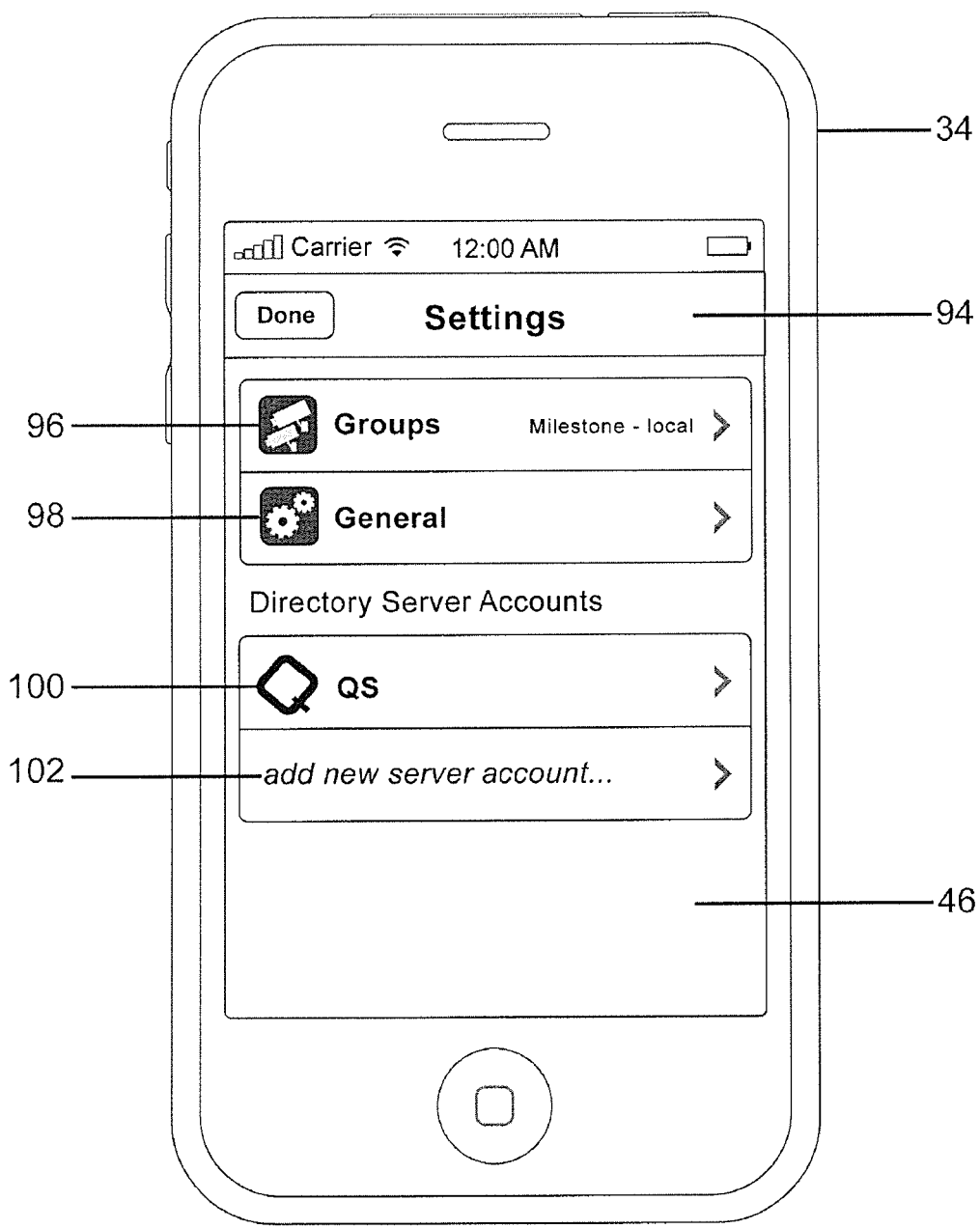
FIG. 5 is a top plan view of the mobile device in portrait orientation and showing a main settings screen on the display.

Turning to FIG. 5, the mobile client 34 is shown in a portrait orientation. Position sensors in the device sense it's orientation and rotate the displayed image accordingly, although this is not necessary in every instance. The touch sensitive display 46 shows the settings screen 94 which is displayed following activation of the gear icon 56 in FIG. 2. At the setting screen 94 a user may select groups 96, which opens a display screen in which the video data from different cameras are grouped into user defined groups. At the groups function 96 the user may add or remove camera feeds, or name or rename the camera feeds and the group labels. Groups of video feeds of other users that are sent to the mobile client 34 may be added or changed using this groups screen. Quick group switching capability is provided by the groups button 96. The cameras are organized into logical groups. The user can press a single button 96 to quickly switch between camera groups. The user can also select a specific group from a full list of available groups.

The setting screen 94 also has a general button 98 that accesses a screen for other settings for the video command application. A directory server accounts listing 100 identifies the servers on which the mobile client 34 has an account for access to a data connection. New server accounts may be added using the add new server account command 102.

Figure 6:
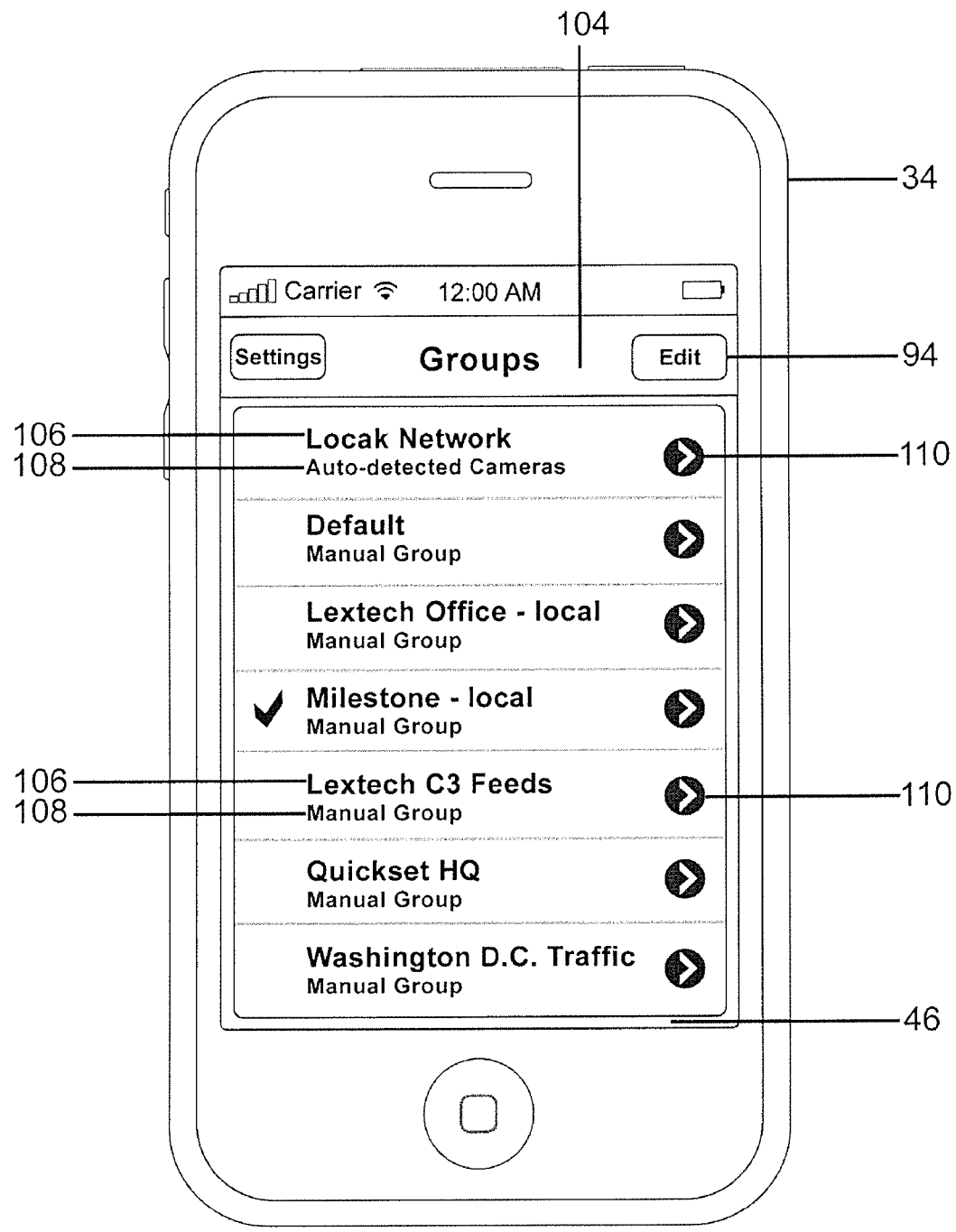
FIG. 6 is a top plan view of the mobile device showing a camera group list.

In FIG. 6 is shown the camera groups screen 104 as displayed on the display panel 46 of the mobile client 34. Groups 106 are listed by the group name assigned by the user. Under each group name is an identifier 108 of whether the cameras providing the video data has been auto detected or manually grouped. An arrow button 110 opens each group to permit viewing of the group members. An edit button 112 is selected by the user for editing the group members, and a settings button 114 returns the user to the previous screen, which here is the setting screen. Similar buttons are provided an several other screens discussed herein and the same description applies.

Figure 7:
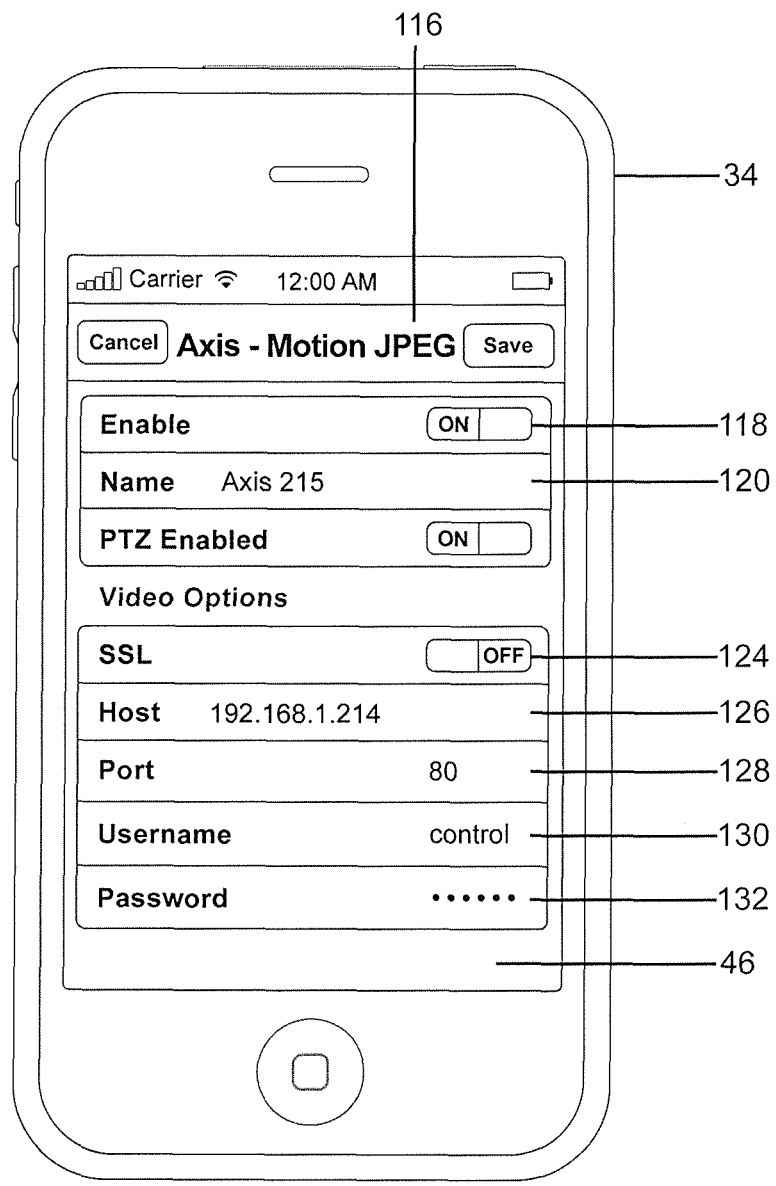
FIG. 7 is a top plan view of the mobile device showing a top portion of a camera configuration screen.

FIG. 7 shows a top portion of a camera configuration screen 116 that is displayed when the user selects the camera configuration icon or button. Commands are provided to enabling or disabling various camera controls and video feed options, including enabling camera operation 118, the name of the camera 120, and enabling the pan, tilt and zoom (PTZ) functions 122 of the camera. The video options provide enabling secure socket layer (SSL) 124, the network address 126 of the host, the port at which the video data is available 128, the user name entry space 130, and the user password entry space 132.

Figure 8:
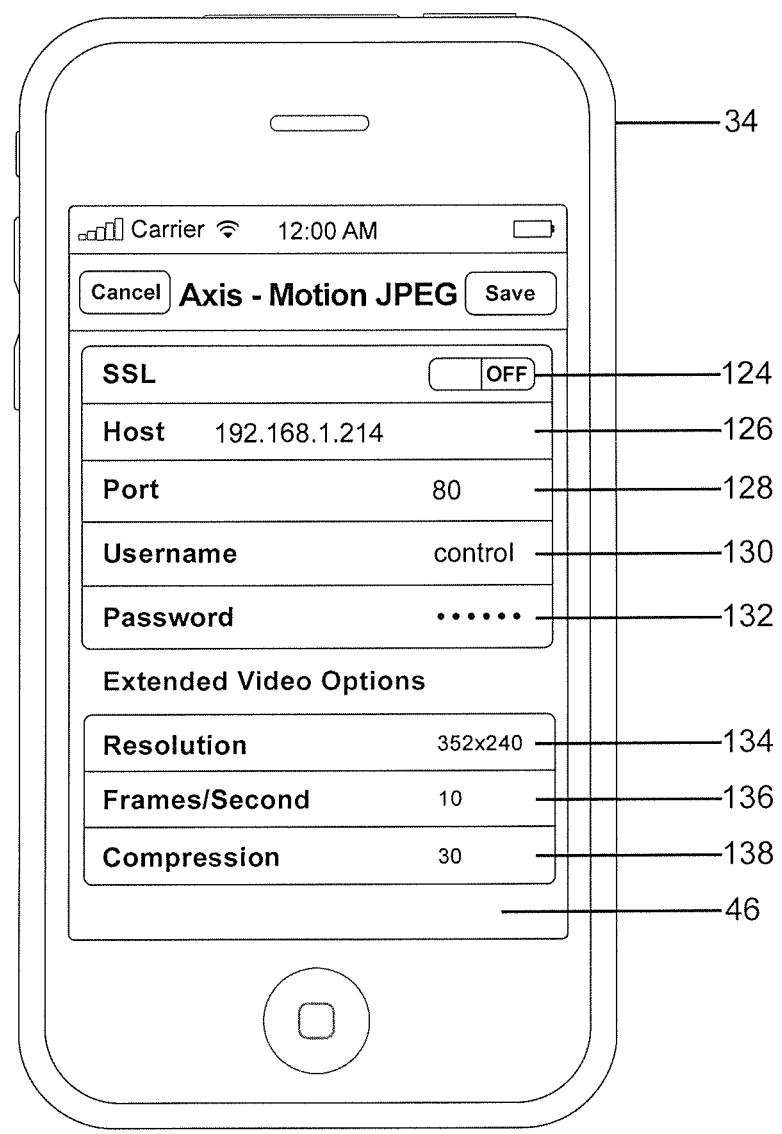
FIG. 8 is a top plan view of the mobile device showing a middle portion of the camera configuration screen.
Figure 9:
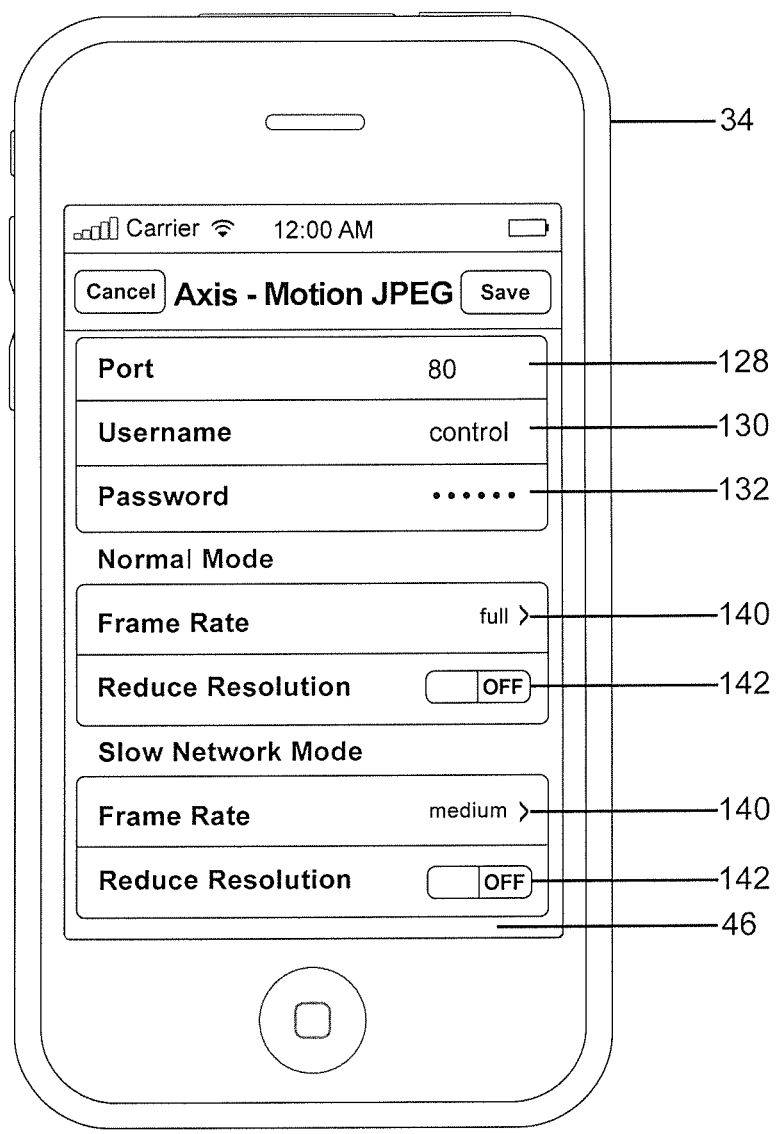
FIG. 9 is a top plan view of the mobile device showing a bottom portion of the camera configuration screen with settings for actions to take when slow networks are identified.

FIG. 7 shows only part of the configuration screen. By scrolling down, such as by using scroll bars or finger motion on the display 46, the middle portion of the screen is shown. FIG. 8 shows the middle portion of the camera configuration screen including settings for screen resolution 134, frame rate or frames per second 136, and compression 138. These are referred to as extended video options. Further scrolling of the settings screen reveals the setting information shown in FIG. 9 at the bottom portion of the camera configuration screen. Here, settings are available for addressing actions to take when slow networks are identified. For example, for normal mode operation, the frame rate 140 is set to full, although other settings may be selected by the user, and the reduced resolution function 142 is disabled. When a slow network connection is encountered by the mobile client 34, the device operates according to the slow network mode settings, including frame rate 144 and reduced resolution 146 enabled or disabled.

Figure 10:
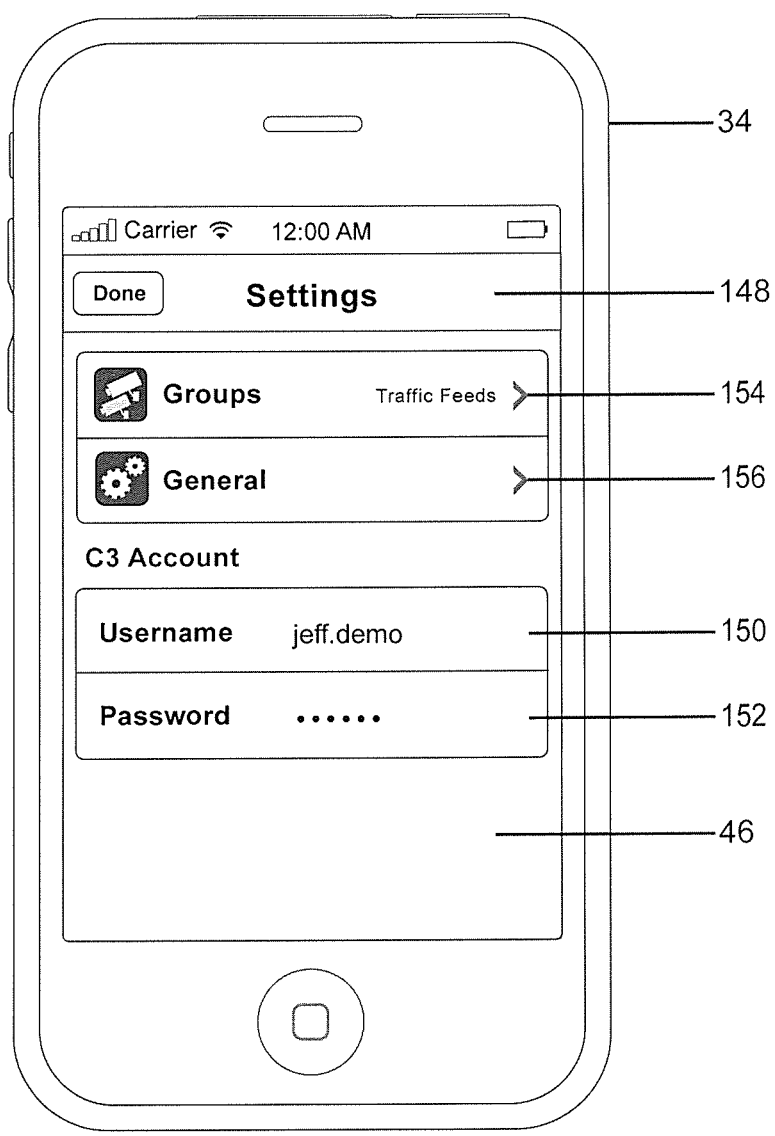
FIG. 10 is a top plan view of the mobile device showing a mobile settings screen.

Dynamic resizing of the source video data on the mobile device and display of the video data in either a full screen or thumbnail view is automatic. The source video can be of any size and aspect ratio. For video sources that support it, directing the video source to dynamically change its resolution, frame rate and compression as suitable for the display size and bandwidth available FIG. 10 shows a mobile settings screen 148. A single username 150 and password 152 entry space enables the user to log into the video monitoring and control service and have the groups 154 auto populated. The general configuration button 156 to reach the configuration screen is shown.

Figure 11:
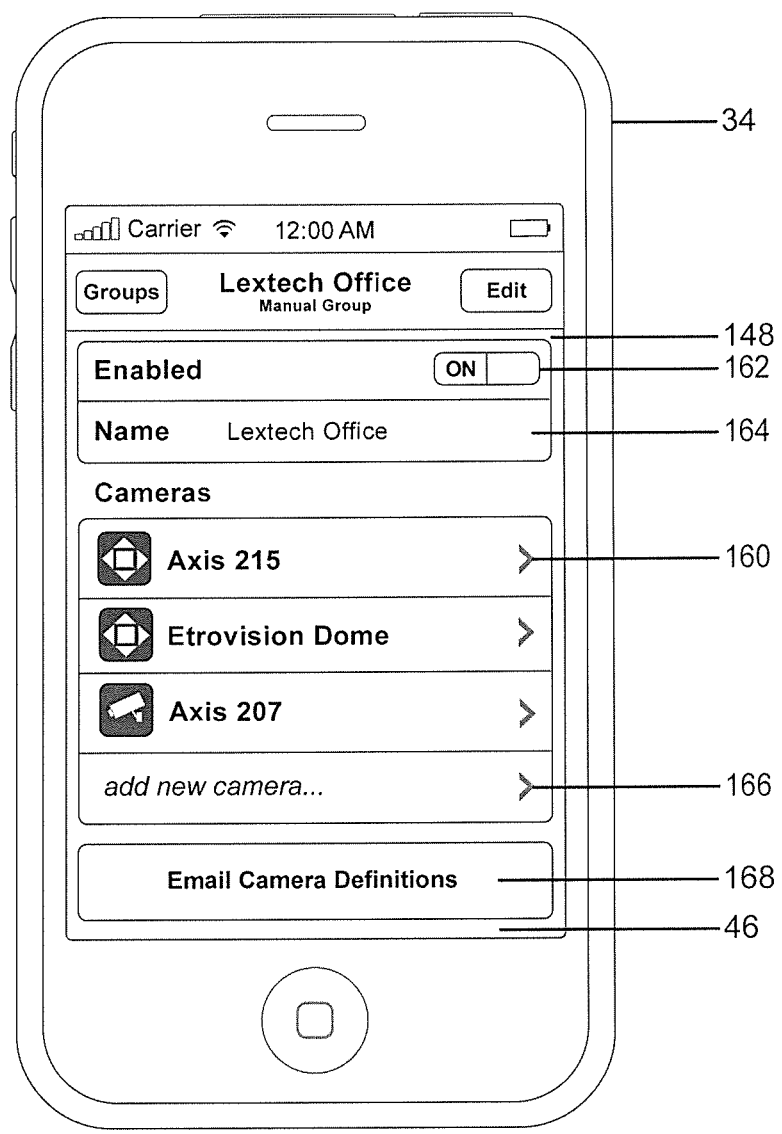
FIG. 11 is a top plan view of the mobile device showing a single group definition with cameras listed.

By selecting a group from the list, the user reaches a screen as shown in FIG. 11, which is a view of a single group definition screen 158 with the cameras that are in the group listed in a list 160. The group may be enabled or disabled by selection of the button 162. The group name is shown at 164. Selection of the edit function and name box calls up a text entry keyboard so that the name can be added or changed. New cameras may be added to the group list 160 by selecting the new camera command 166. As will be discussed hereinafter in conjunction with a process flow chart, the camera definitions for this group may be mailed to another user by selecting the email camera definitions command 168.

Figure 12:
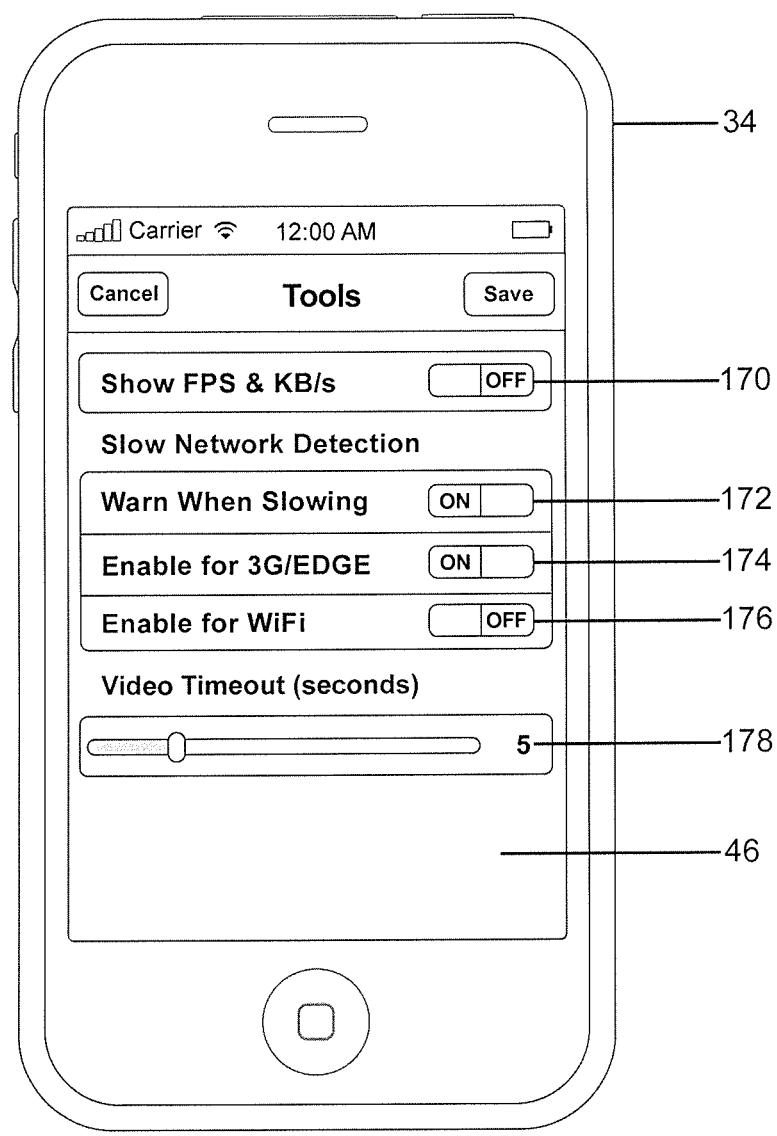
FIG. 12 is a top plan view of the mobile device showing a tools screen for tuning parameters and changing settings.

FIG. 12 a tools screen for tuning parameters and changing settings is provided for the mobile client 34. The user may elect to display frames per second (FPS) and kilobytes of data per second (KB/s) by selecting the command 170. Variations in connection speed are apparent, enabling the user to possibly seek out a better network connection location. Slow network connection settings include emitting a warning of network slowing 170, enabling the slow network detection for the 3G/EDGE network 174, and enabling the slow network detection for a WiFi network 176. The user may also set the time for video timeout 178.

Figure 13:
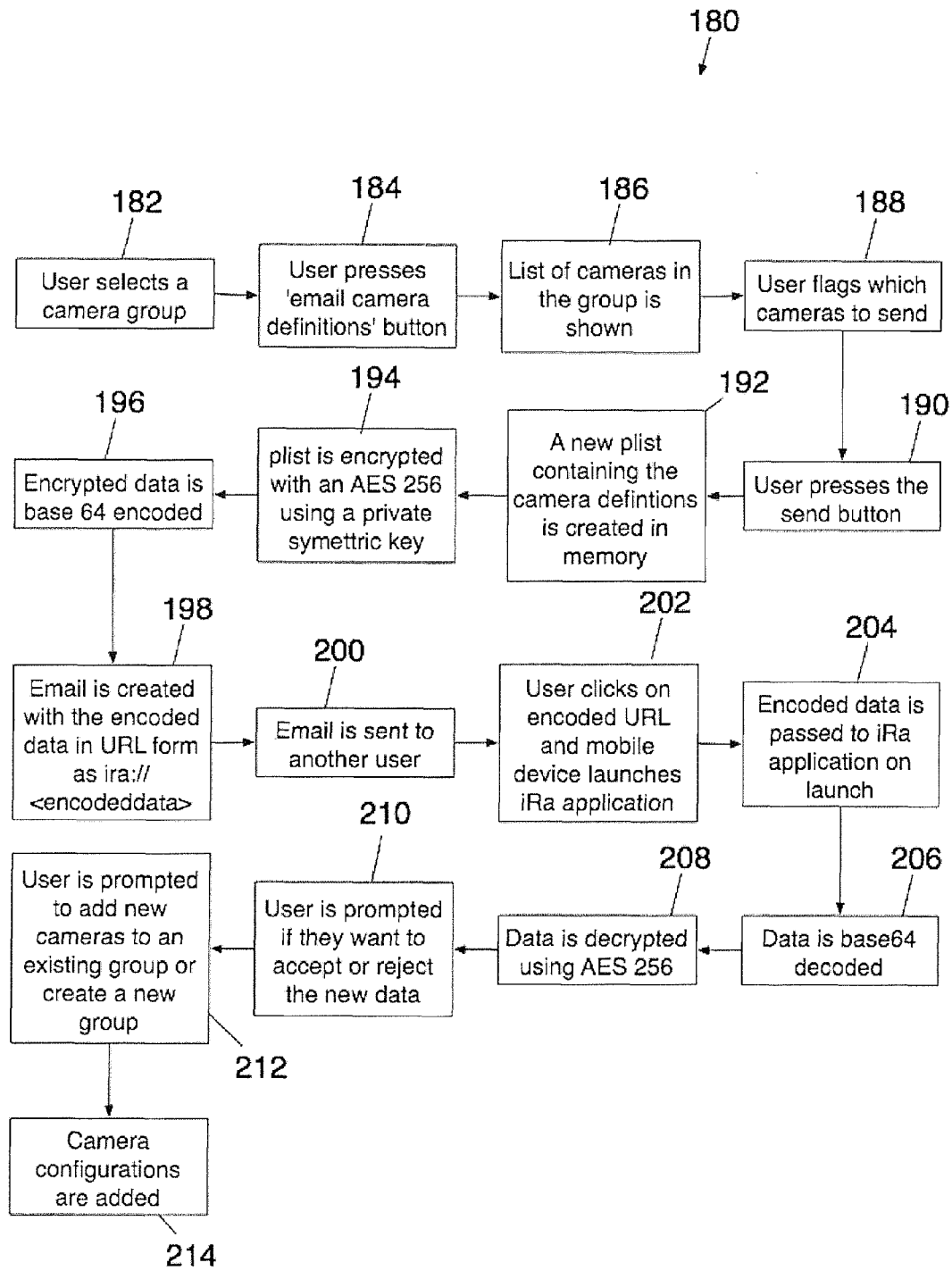
FIG. 13 is a process flow chart of a method for transferring camera configuration information to a user.

FIG. 13 is a process flow chart 180 of a method for transferring camera configuration information to a user. The configuration information may be sent from a base to a remote user or from mobile user to mobile user. Using the illustrated process or method, camera configurations may be securely sent from one user to another. In the first step 182, the user selects a camera group to send. In step 184, the user presses the email camera definitions button 168 of FIG. 11. A list of the cameras in the group is show at 186. The user selects or flags the cameras to send at 188. The user presses the send button at 190. This causes a file, here called a plist, containing camera definitions to be created in the memory of the mobile client 34 at 192. The file, or plist, is encrypted at step 194. In one embodiment, the encryption is by AES 256 bit encryption using a private symmetric key scheme. At 196, the encrypted data is base 64 encoded. An email is created at 198 that includes the encoded data. In the preferred embodiment, the data is in the form of a URL (uniform resource locator), one example of which is shown in the drawing. In step 200 the email is sent from the sender to the receiving user. The receiving user receives the email, opens it and selects or clicks on the encoded URL. This causes the mobile client to launch the video command application, here referred to as iRa, at step 202. The encoded data is passed to the video command application at 204 upon launch of the application. In step 206, the data is decoded, and at step 208 it is decrypted. The receiving user may elect to accept or reject the new data at step 210. In 212, the receiving user is prompted to either add the new camera definitions to an existing group on the receiving user's mobile client or to create a new group for the new cameras. Lastly, the new camera configurations are added at step 214 so that the new cameras are implemented in the video command application of the receiving mobile client.

Using this method, security personnel at a location can quickly pass along the camera definitions to first responders that have been dispatched to the location so that the first responders may view security cameras showing the location. New security staff at a location may be easily provided with the ability to view cameras at the location. Reassignments of security staff from one area to another area are simple. Other uses for this method are of course possible.

Advantages for encrypted camera configuration bundle emailing include that the user can select individual cameras or groups of cameras and create an encrypted data bundle of those definitions and configuration information. The bundle can be appended to an email, posted to a web site or otherwise distributed. The bundle is in the form of a URL link which will trigger the mobile application on an iPhone or iPod Touch platform or other device to launch and import the data. The encrypted bundle ensures that even though a new user may have access to the camera, they are not provided the password for that camera. A stand alone tool can also read and generate these camera configurations.

Figure 14:
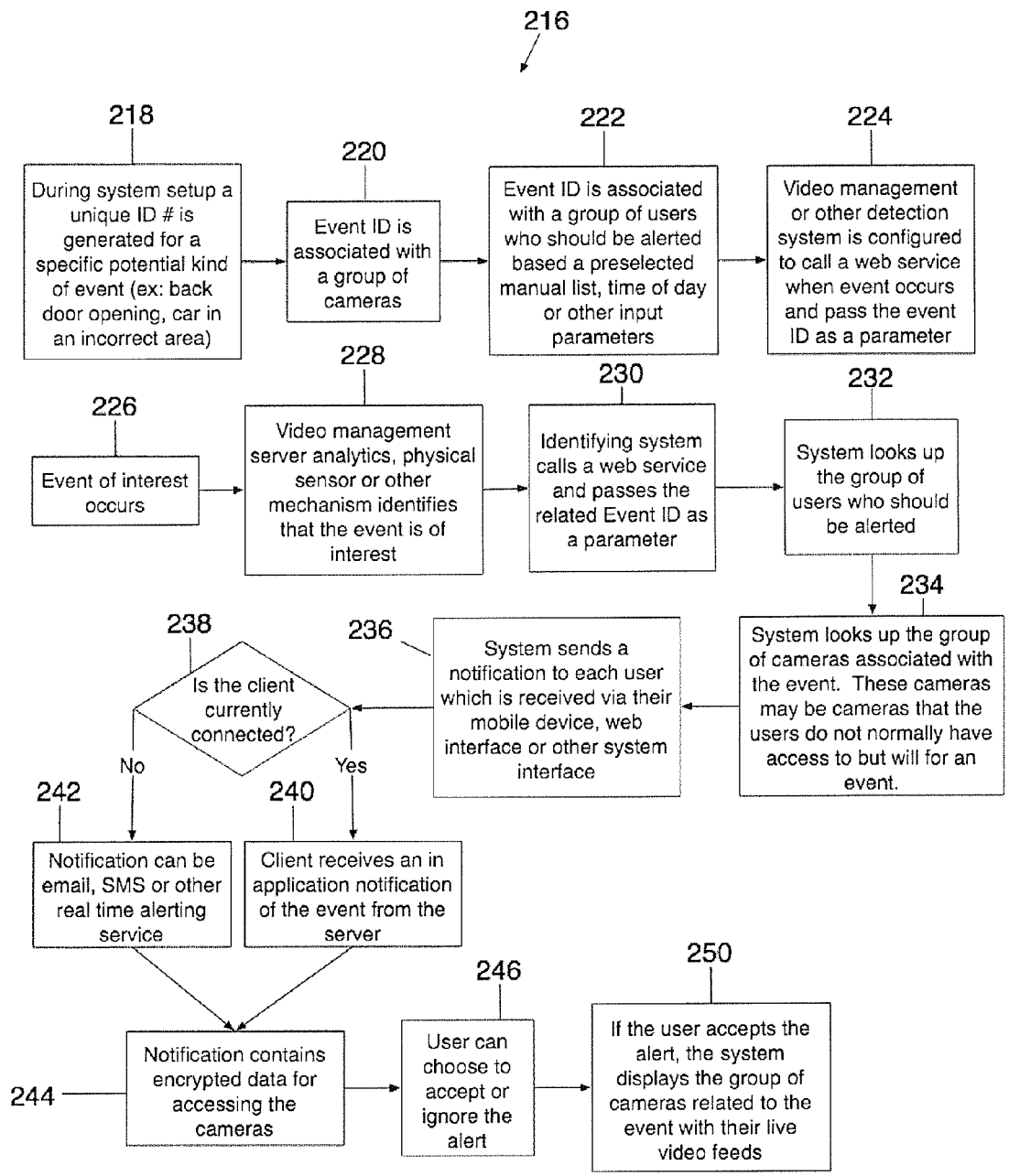
FIG. 14 is a process flow chart of a method of identification and delivery of events of interest to users so they can see video related to the event.

In FIG. 14 is shown a method 216 of identification and delivery of events of interest to users so they can see video related to the event. This events and alert delivery method 216 includes a step 218 of generating a identification number or code for potential kinds of events. The identification number is unique and is tied to specific events, such as an opening of a door or a vehicle entering a restricted area. The event identification is associated with a camera or a group of cameras at 220. In step 222, a group of users who should be alerted to the event is associated with the event identification number. Parameters may be applied to the users, such as times of the day for alerting different user's. Other parameters maybe manually input. The video management system or other detection system associated with the present system is configured to call or otherwise contact a web service when the event occurs and pass the event identification to the web service as a parameter.

The process of FIG. 14 continues when an event of interest occurs, at step 226. A determination is made at 228 that the event is an event of interest as defined in the prior steps. The video management server may be used in the determination, or some other physical sensor or mechanism. In step 230, the identifying system calls or contacts the web service and passes along the event identification as a parameter. The system looks up the group of users who should be alerted to the event, at 232. The system also looks up the group of cameras that are associated with the event, at 234. These cameras may be cameras that the users normally have access to or may include cameras that the users do not normally have access to but for the event. A notification is sent to the mobile clients of each of the users or to a web interface or other system interface, at 236. An inquiry is made as to whether the user's client is currently connected, at 238. If the mobile client 34 is connected, the client receives a notification of the event from the server to the video command application, at step 240. If the client is not connected, the notification is sent to the user via email, SMS message or other real time alerting system, at 242. The notification includes encryption data for accessing the relevant cameras, as shown at 244. The user may accept or ignore the alert in step 246. In step 250, if the user accepts the alert, the video command application displays the group of cameras that are related to the event and live video data is displayed, either on the mobile client or on a desktop application.

In the alerting and event delivery function, a gateway server listens for alerts to be delivered to specific clients. If the client device is currently connected to the server, it receives an in-application notification of the alert. If the client is not connected, the notification is delivered as a link embedded in an email or SMS message. When the link is pressed or activated, the mobile client launches the email or SMS application and displays the notification. The notification contains all the configuration necessary to connect to a camera or group of camera. If the user chooses to see the notification, a temporary view is created showing the user or group of users the contained camera or group of cameras.

Figure 15:
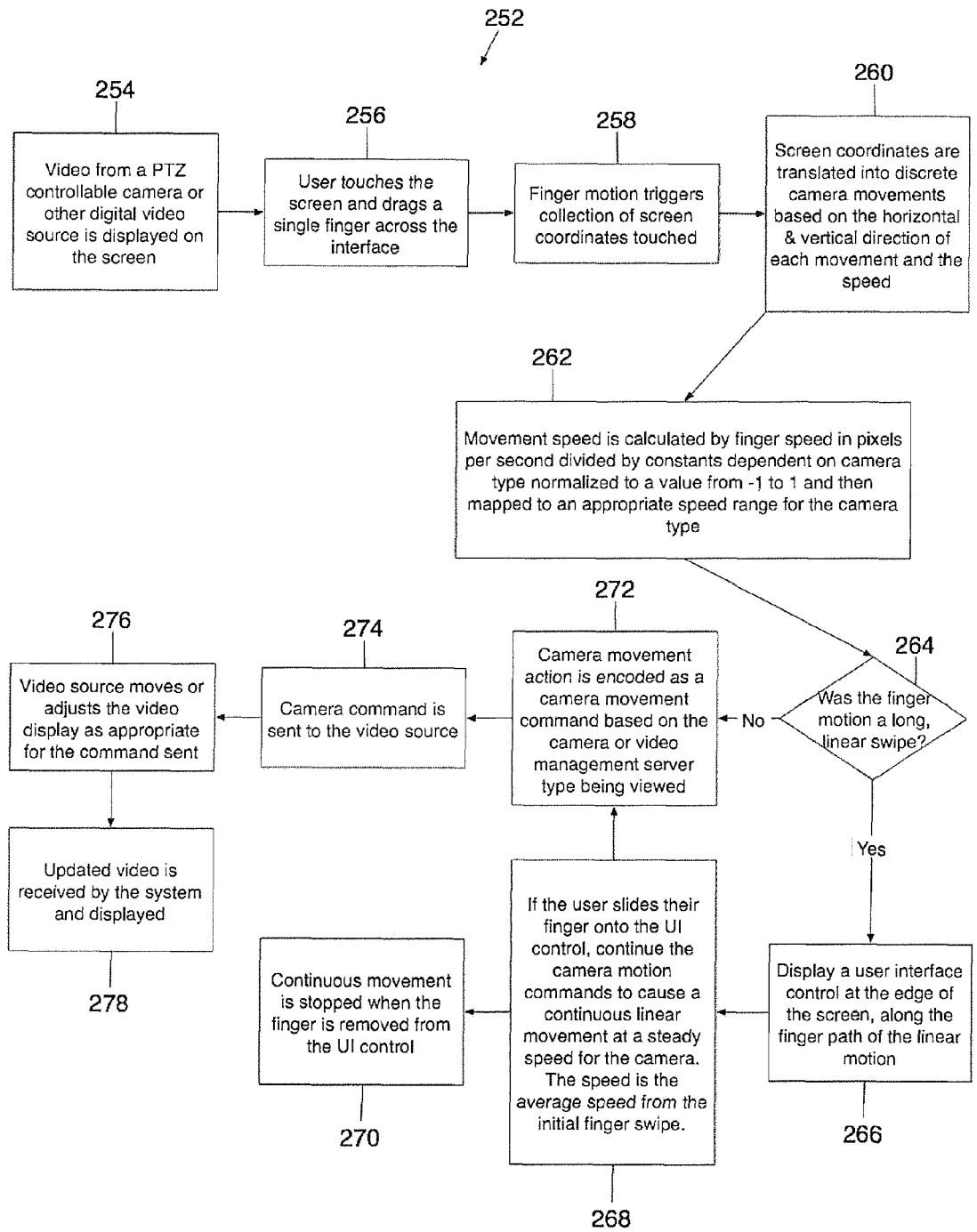
FIG. 15 is a process flow chart of a method of method of camera motion control using a touch screen interface.

FIG. 15 shows a method 252 of camera motion control using a touch screen interface. The process of controlling physical camera motion or manipulating a video feed using a touch screen that is displaying the video includes a first step 254 of displaying on a screen the video from a video source such as a controllable pan, tilt, zoom camera. The user of the mobile client 34 touches the touch screen 46 and drags a single finger or stylus across the interface, at step 256. In 258, the finger or stylus motion triggers activation of a collection of screen coordinates. The screen coordinates are translated into discrete camera movements in step 260. The camera movements are based on the horizontal and vertical direction and on the speed of each finger or stylus movement. According to step 262, the movement speed is calculated by determining finger speed across the interface in pixels per second. This value is divided by constants that are dependent on camera type normalized to a value from +1 to −1, which is mapped to an appropriate speed range for the camera type.

An inquiry is made as to whether the finger motion on the interface was a long, linear swipe, as shown at the decision block 264. If the finger motion is a linear swipe, a user interface control is displayed, according to 266, at the edge of the screen along the linear motion direction of the finger path. If the user slides a finger onto the user interface (UI) control, commands for continuous motion of the camera are forwarded to the camera to cause a continuous linear movement of the camera at a steady speed. The speed of the camera is determined from an average speed of the initial finger swipe. According to step 270, when the user removes the finger from the user interface, the continuous movement of the camera is stopped.

The user's finger or stylus contact with the user interface is encoded as a camera movement command based on the camera movement action by the user, at step 272. The camera command is based on the camera or on the video management server type being viewed on screen. In step 274, the camera command is sent to the video source. In response to the command, the video source moves or adjusts the video display as appropriate for the transmitted command, see step 276. In 278, the updated video data with the new camera orientation or setting is displayed on the view screen of the mobile client 34. As noted above at 270, the removal of the user's finger from the user interface control halts the transmission of the movement command and thus halts the movement of the camera.

As one might imagine, access to security camera data over a wireless network must be restricted. Various encryption techniques are envisioned to ensure access only by the intended recipient of the video data. One such encryption model is provided in the "cloud" or network for configuration data. The cloud is the multi-server hosted setup where the backend software lives. The cloud lives across multiple back end servers. Each user has their own 256 bit symmetric user key (UserKey). The key is generated each time the user logs in by using the SHA-256 (secure hash algorithm) to hash their password. The user key is never stored on disk and exists only briefly in memory during the login process. When a new organization is created, it is assigned a randomly generated 256 bit symmetric organization key (OrgKey). All device configuration information is encrypted with this key using the AES-256 (advanced encryption standard). The OrgKey is never stored unencrypted on a disk and is kept only in memory. When a new user is created, their user record is given a copy of the OrgKey that has been encrypted using their UserKey with the AES-256 standard. When a user logs in, their UserKey is computed from their password. The UserKey is then used to decrypt their copy of the OrgKey, which is kept in memory for the length of the user's session. Whenever the user performs an operations that requires device configuration, it is decrypted using their copy of the OrgKey. In addition to the encryption that protects user data on the server, the present system also uses the SSL (secure socket layer) to protect the data while in transit.

Figure 16:
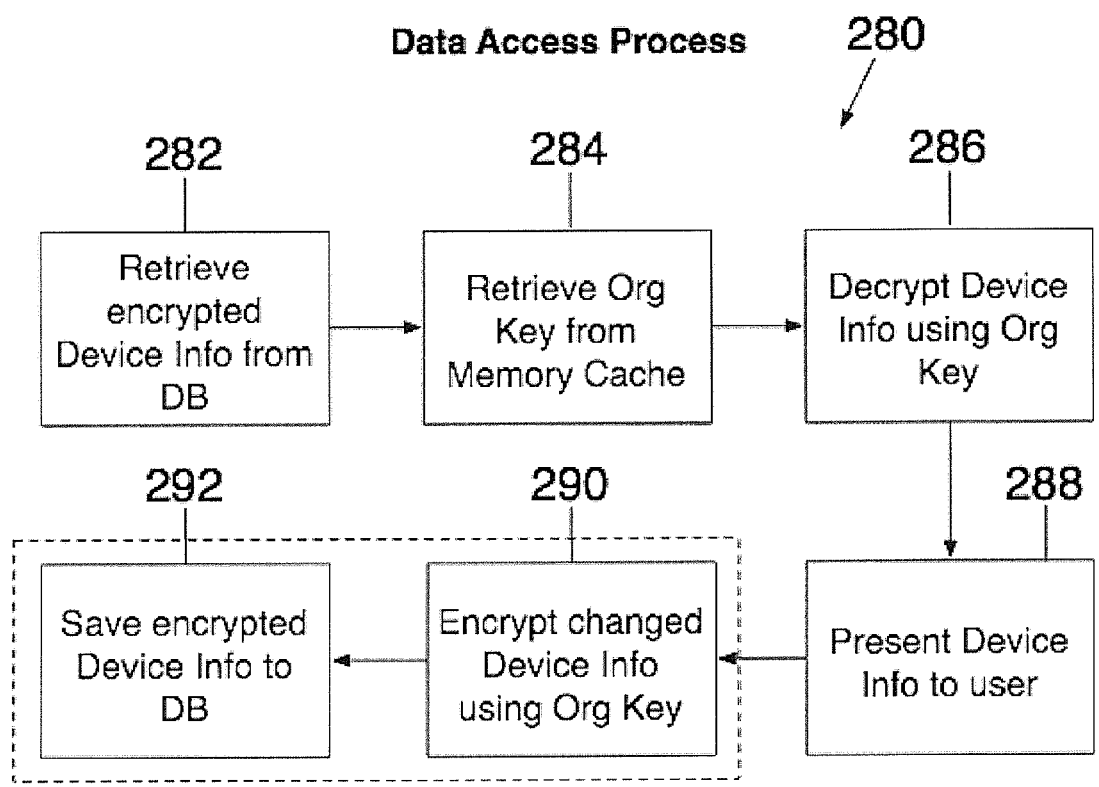
FIG. 16 is a process flow chart of a method of back end encryption for data access.

One example of a data access process 280 is shown in FIG. 16, wherein back end encryption for data access is provided. In step 282, encrypted device information is retrieved from a database (DB). The database may be accessible via the network. The organization key is retrieved from the memory cache of the mobile client at 284. The organization key is used to decrypt the device information at step 286. The device information is presented to the user at 288. For any changes in the device information, changed device information is encrypted using the organization key, at step 290 and the encrypted device information is saved to a database at 292. Changed device information steps are enclosed within a broken outline.

Figure 17:
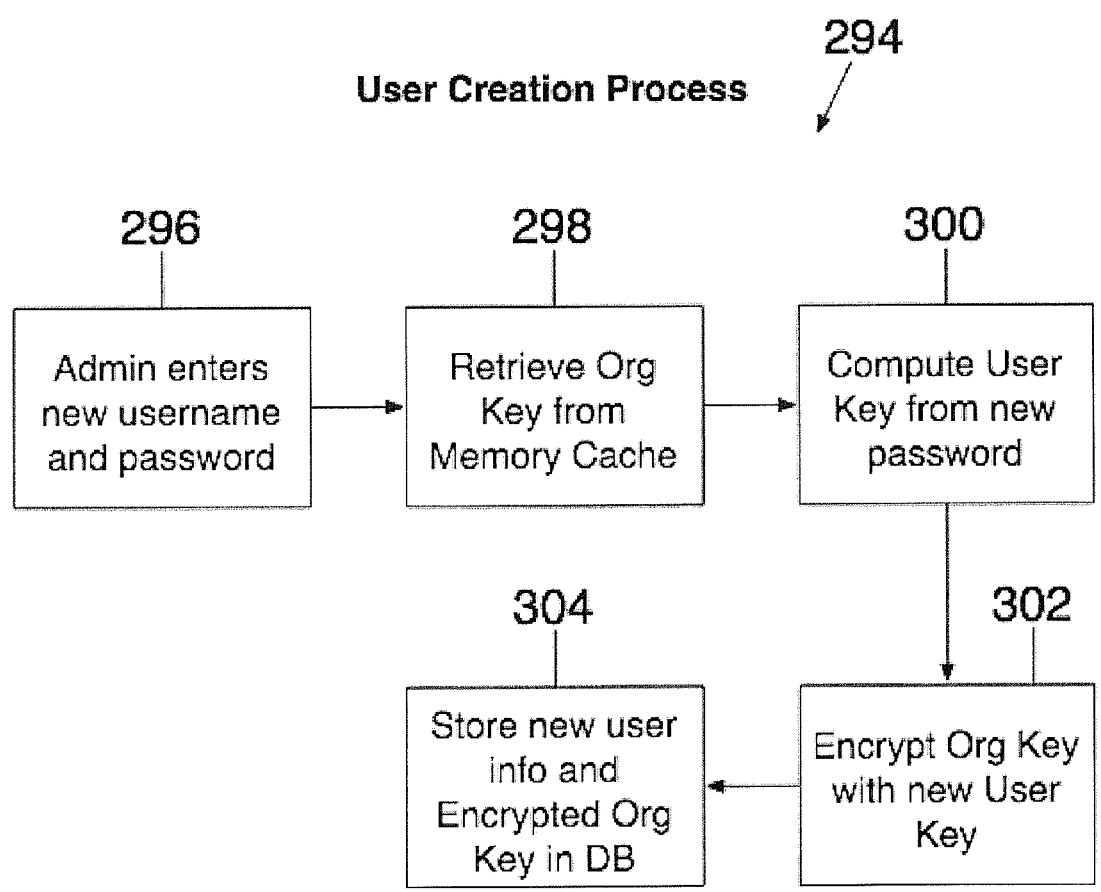
FIG. 17 is a process flow chart of a method for creating a user account on the mobile device.

FIG. 17 shows a user creation process 294 for the mobile client 34. At 296 an administrator enters a new user name and password for the user. The organization key is retrieved from the memory cache of the mobile client 34 in step 298. A new user key is computed from the new password in step 300. The organization key is encrypted with the new user key at 302, and the new user information and encrypted organization key is stored in a database at 304.

Figure 18:
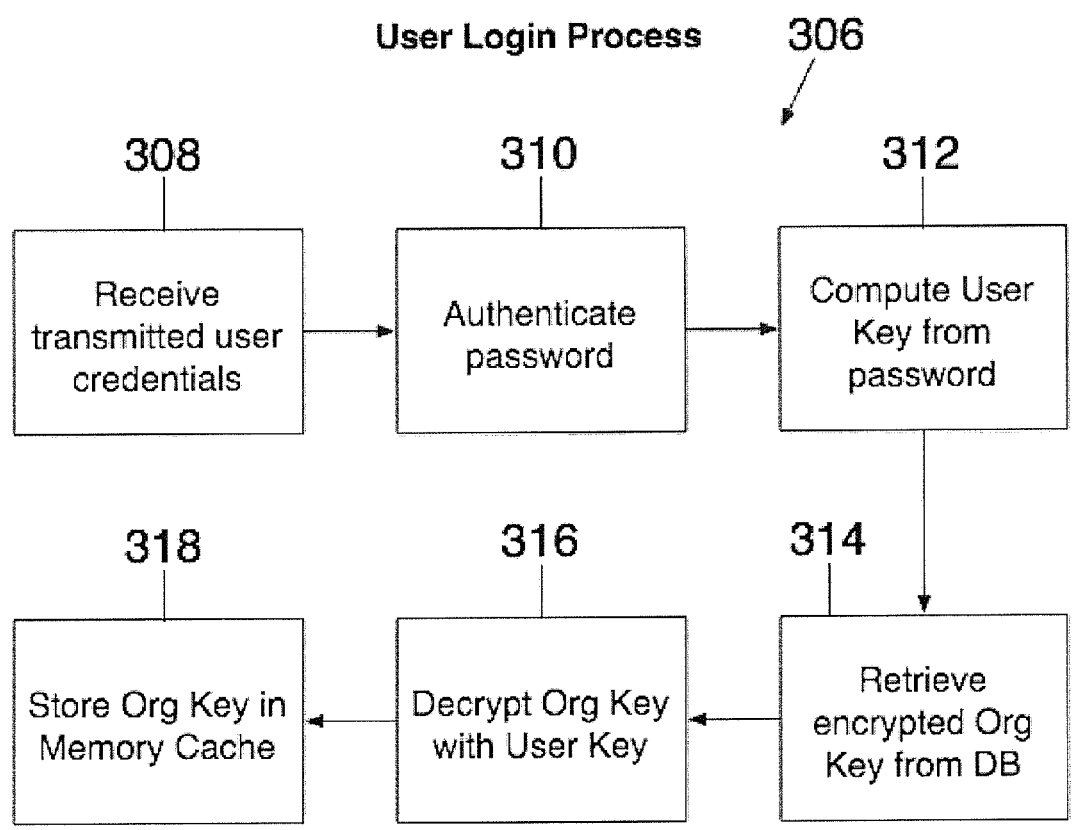
FIG. 18 is a process flow chart of a method for user log in to the mobile device.

A user log in process 306 is shown in FIG. 18. A user transmits user credentials, which are received at step 308. The user credentials include a password, which is authenticated at 310. In 312, the user key is computed from the password. The encrypted organization key is retrieved from the database, in step 314. Using the user key, the organization key is decrypted, at 316. The organization key is stored in a memory cache in the mobile client 34, at step 318. The user has now successfully logged on to the mobile client.

Figure 19:
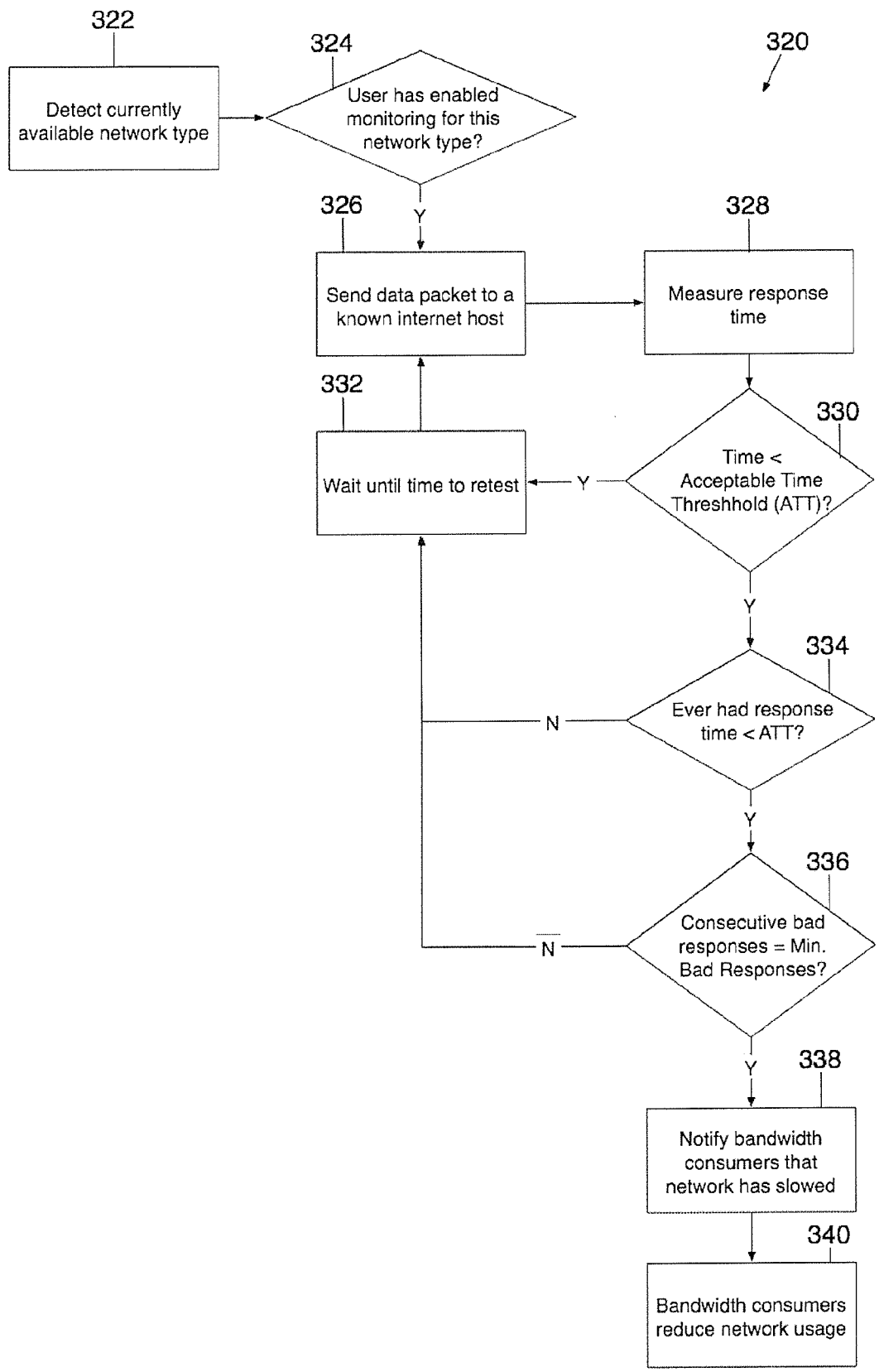
FIG. 19 is a process flow chart of a method of detecting slow data transfer over a network connection and responding to the slow transfer.

In FIG. 19 is shown a method 320 of dynamic slow-mo network mode detection and response. The process of identifying when network latency increases implements changes requiring using less bandwidth for video feeds. In a first step 322, the mobile client 34 detects currently available network types. A check is made as to whether the user has enabled monitoring for a detected network type, at 324. If the network monitoring is not enabled, the process ends; but if monitoring is enabled, the mobile client 34 sends a data packet to a known Internet host, at 326. In step 328, the response time is measured. The response time is compared to a threshold of acceptable time at 330. If the response time is less than the acceptable threshold time, then the mobile client 34 waits a period of time until a retest is performed, as shown at 332. The retest returns the process to step 326.

If the delay is beyond the acceptable threshold, a question is posed as to whether the response time has ever been within the threshold of acceptable time, at 334. This is to determine, in addition to whether the network is slow, is if the video command application is having a negative effect on the network. If the inquiry has never gotten a response within the Acceptable Time Threshold (ATT), a determination is made that the application has not adversely impacted the network, it just naturally has a high latency. In that case, the application does not attempt to reduce its usage. If at step 334 the answer is no, the mobile client 34 waits until a time to retest, at 332. If yes, the process asks whether the number of consecutive bad responses equal the minimum number of bad responses, at 336. If yes, a notification is sent to bandwidth consumers that the network has slowed, at 338. The network consumers may include the video data sources. The bandwidth consumers reduce the network usage at 340. If the number of consecutive bad responses at 336 do not yet equal the number of minimum bad responses, the process returns to the wait step 332.

The video command application sends a request to the cameras to reduce network usage, such as by reducing resolution of the video data transmitted by the one or more of the cameras. The cameras need only transmit the resolution of video signal used by the mobile device. When thumbnail sized video fields are displayed, only a relatively low resolution data feed is required so that the camera need only feed the low resolution signal. This is particularly true for the multi-field view having six simultaneous video fields displayed, for example as shown in FIG. 2. Higher resolution signals are required from the camera for the full screen view of FIG. 3 but only a single video data feed is needed for the real time video display. The mobile client 34 generally has a screen of a lower resolution than the full resolution of the cameras, so even at full screen view the transmitted video signal may be at reduced resolution. The full resolution of the camera signal may be required where the user seeks an enlarged view of the video field, for example where the user enlarges the image to larger than screen size.

Figure 20:
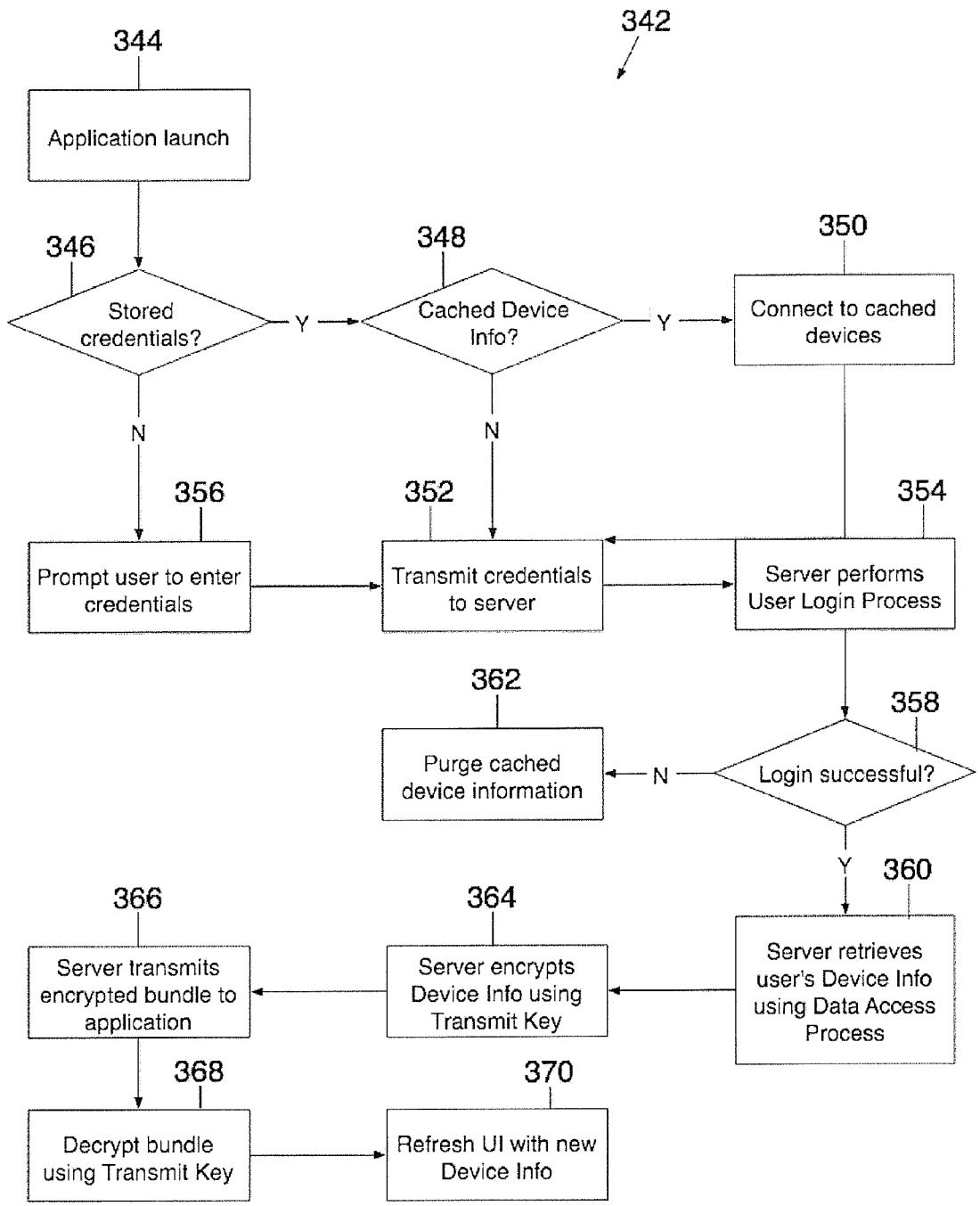
FIG. 20 is a process flow chart of a method of logging in to a mobile device that includes cached camera definitions.

Turning to FIG. 20, a process is shown for mobile login including cached camera definitions. The process 342 of controlling physical camera motion or manipulating a video feed using a touch screen that is displaying the video according to this embodiment includes a step of launching the application at 344. An inquiry is made as to whether there are stored user credentials in the mobile client 34, at step 346. If there are, the inquiry is made as to whether there is cached device information, at 348, for example device information for the cameras. If yes, then the mobile client 34 connects to the cached devices at 350. The credentials are transmitted to the server at 352 and the server performs the user log in process at 354.

Where the application does not find stored credentials on the mobile client at 346, a prompt is presented to the user to enter the credentials, at 356. The credentials are transmitted to the server at 352 and the server performs the user log in at 354. If no cached device information is found at 348, the credentials are still transmitted to the server at 352 and the server performs the user log in at 354.

The server log in effort if successful at 358 results in the server retrieving the user's device information using the data access process, step 360. An example of the data access process is shown at FIG. 16. If the log in was unsuccessful, the cached device information is purged at 362. Returning to the process for successful log in, the server encrypts the device information using the transmit key, at 364. The server then transmits the encrypted bundle to the video command application at 366. In step 368, the bundle is decrypted using the transmit key. The user interface of the device is refreshed with the new device information at step 370.

Figure 21:
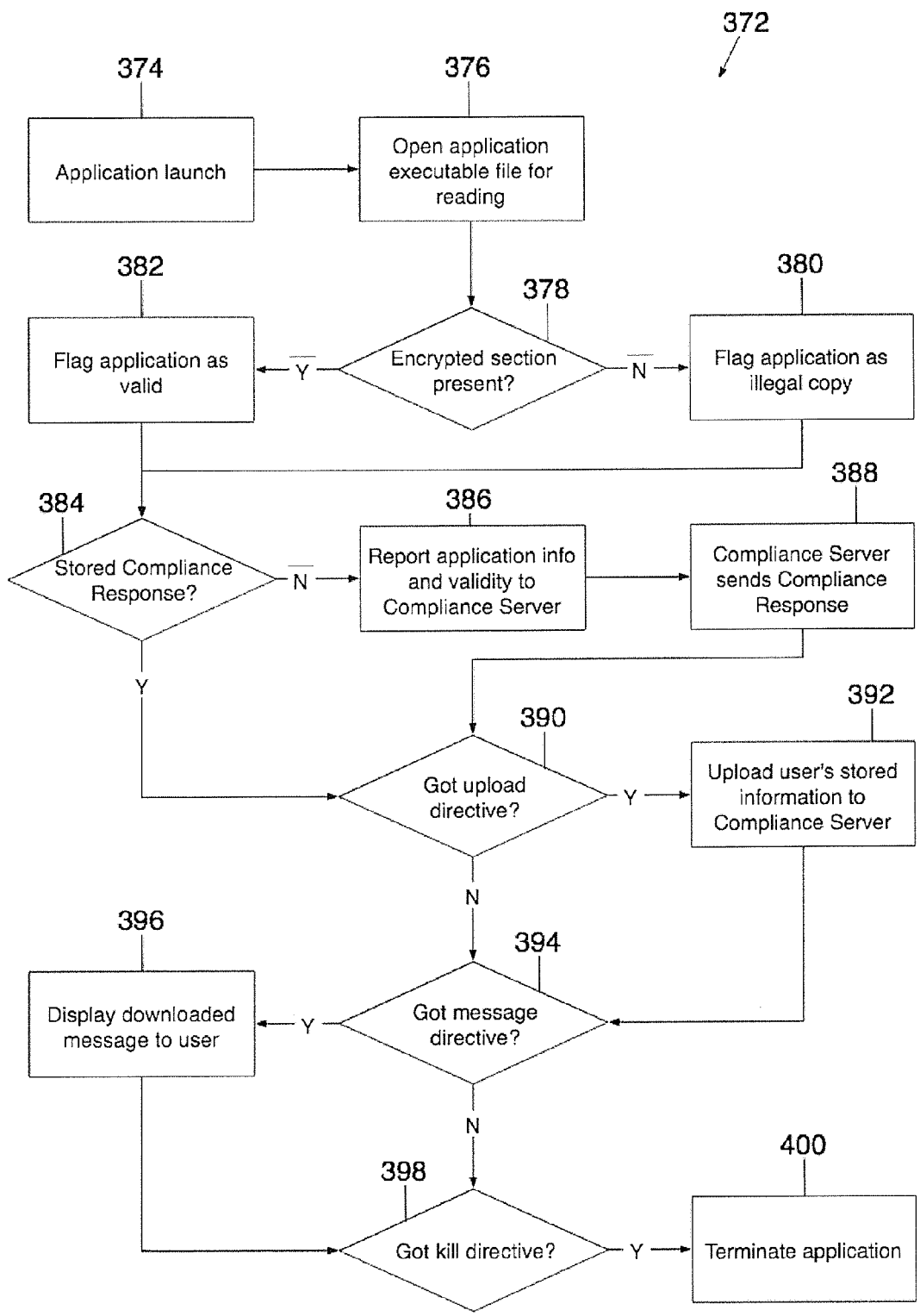
FIG. 21 is a process flow chart of a method of detecting piracy, responding to messages, terminating the application, and collecting user information.

FIG. 21 shows a piracy detection method and processing of pop-ups and other information handling. The process 372 of detecting a pirated, or unauthorized, copy of the video command iPhone application begins with launch of the application at 374. The application executable file is opened for reading at step 376. After being opened, a determination is made at 378 as to whether a certain encrypted section is present in the application copy. If not, the application is flagged as an illegal, or unauthorized, copy at 380. If the encrypted section is present in the application, the application is flagged as a valid copy at 382. Whether the copy is authorized or not, an inquiry is made as to whether a stored compliance response is found, at 384. If no compliance response has been stored, a report is forwarded to a compliance server at 386 to report the application information and validity. The compliance server sends a compliance response at 388.

If the stored compliance response is found, or after forwarding of the compliance response, an inquiry is made as to whether an upload directive is available, at 390. If so, the user's stored information is uploaded to the compliance server at 392. An inquiry is made as to whether a message directive is present, at 394 and if so the downloaded message is displayed to the user at 396. An inquiry is made as to whether a kill directive is present at 398, and if so the application is terminated at 400. Thus, the method provides responses to pop-up messages, application termination, or collecting user information.

Thus, remote triggering of a pop-up message is provided, remote grab of camera and device information is also possible, as well as remote kill of an application. At application load time, the application reports its status information to a compliance server, including application version number, device unique ID, and whether the application is a legal copy. The compliance server examines the reported status, and decides what instructions to send to the application's compliance manager. Possible actions include any combination of the following: display a custom message to the user; upload the user's device configuration information to the compliance server; or disable the application.

Figure 22:
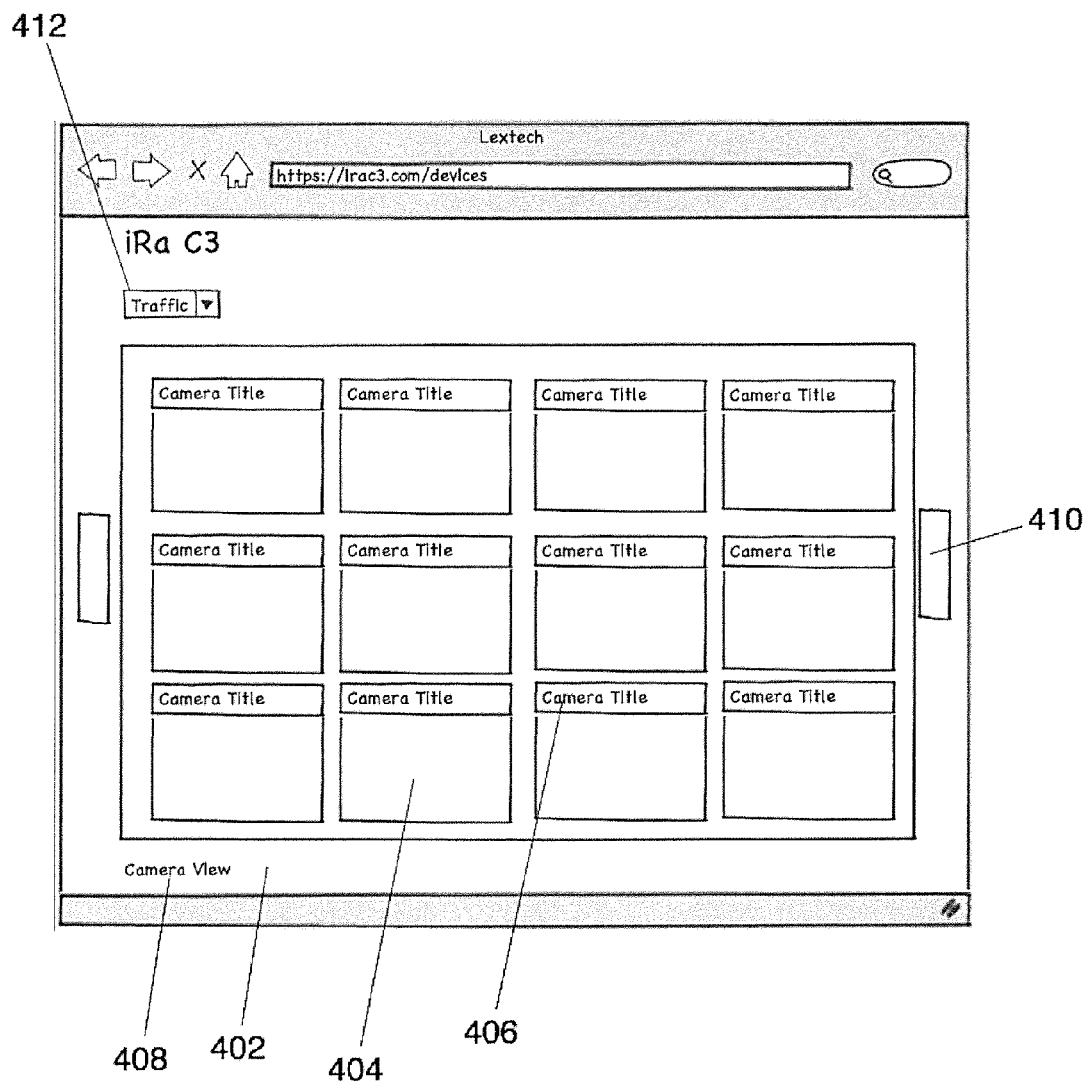
FIG. 22 is a screen shot of a computer screen showing a desktop application according to the principles of the present invention wherein is displayed multiple video fields.

A web view for a desktop or laptop computer running a version of the video command application for operation on a Windows or Mac computer, for example, is shown in FIG. 22. The desktop application includes the same functionality as the mobile client application but is done a little differently to compensate for the lack of widespread availability of touch screen desktop computers. As multi-touch capable desktop touch screens (able to handle multiple simultaneous fingers) become available, the desktop application will utilize this feature so that desktop features are closer to the mobile client interface. A main web video view screen includes a viewing area 402 in which are shown a plurality of video display fields 404, each at a reduced size or thumbnail view. Twelve reduced size fields are shown in this view. Each video field 402 is provided with a label 406 as applied by the user, indicating the source of the video data stream. More video sources or cameras are included in the selected group, which is indicated by a_of_pages indicator 408. An arrow 410 is provided to access the other pages to the right that show the next cameras in the group. A left arrow appears if pages are present to the left. The arrows replace the finger swipe or page flip function of the mobile client. The displayed group is shown at button 412, where selection of a different group may be entered by a pull-down menu. Standard Windows commands, menus and icons are provided across the top of this screen shot.

Figure 23:
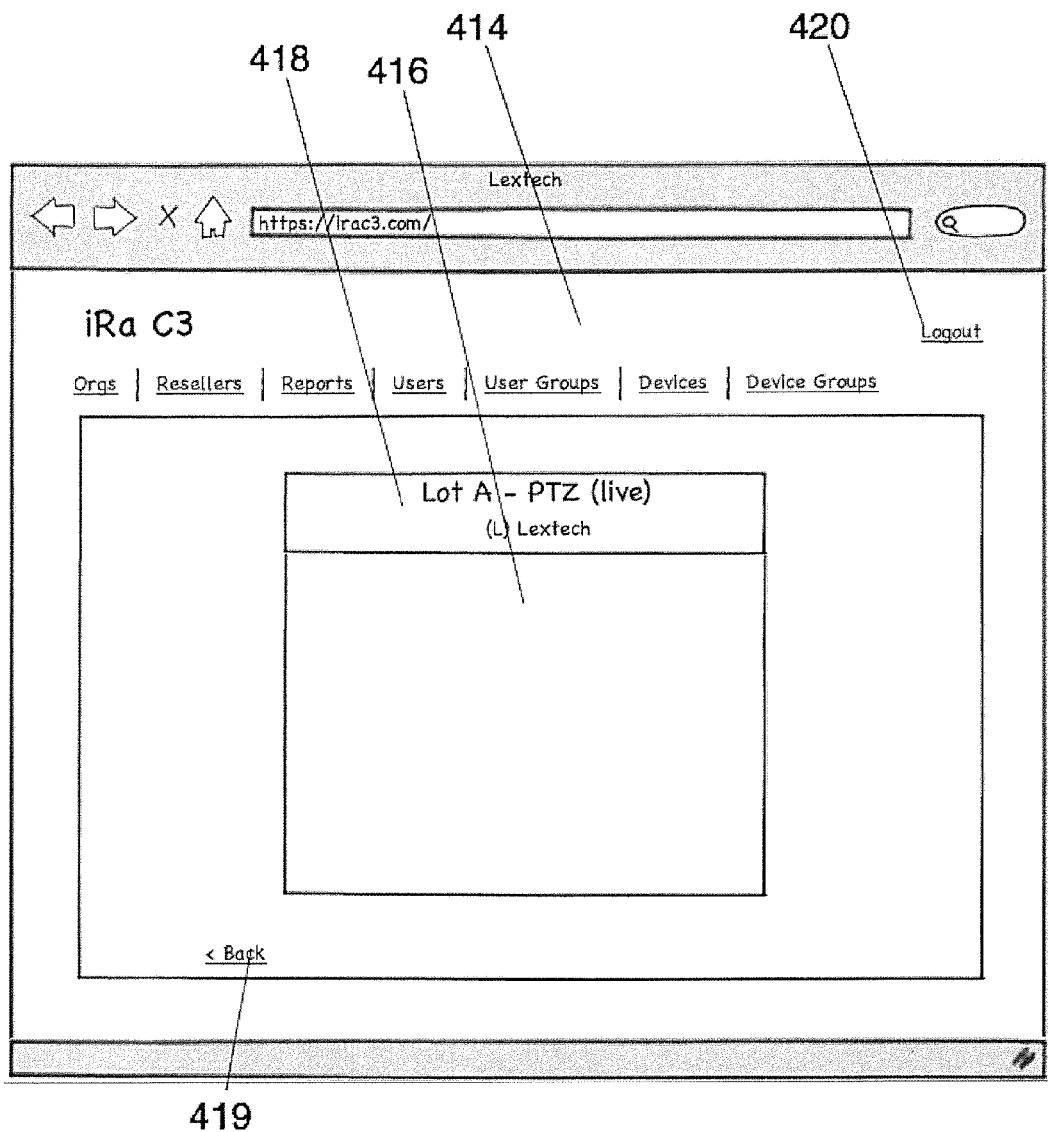
FIG. 23 is a screen shot of a computer screen showing the desktop application of FIG. 22 wherein is displayed a single video feed.

FIG. 23 shows a single video view and camera control screen 414. The user has reached this view by selecting a video field from the view of FIG. 22, for example by clicking with a mouse or other pointing device. In the single video view 416, the user may send camera movement commands to the camera by single clicking on the displayed video screen, which moves the camera to point at that location. The plus and minus (+/−) icons in the upper right control the zoom in/out function, rather than the pinch on the multi-touch screen. The user defined label 418 is provided at the top of the video view 416. The user may return to the group screen by selecting the back command 418. A log out command 420 is also provided.

Figure 24:
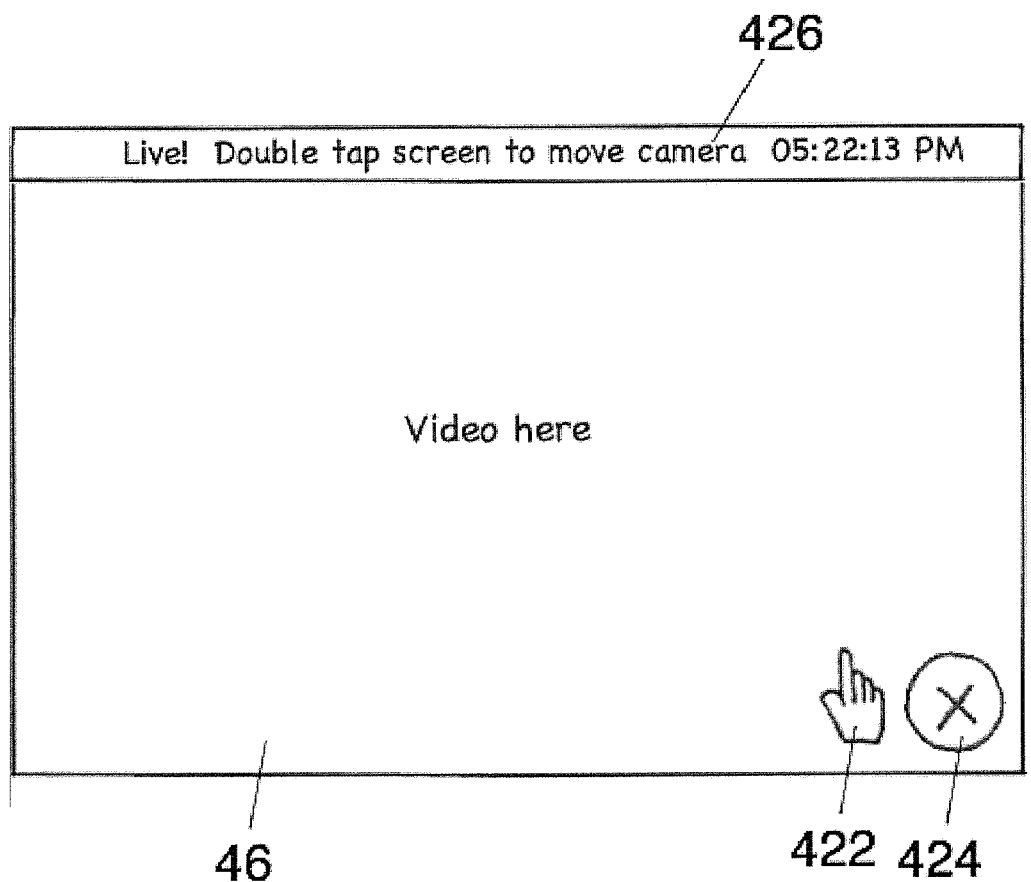
FIG. 24 is a screen shot of a video field showing overlaid control icons.

In FIG. 24, the user interface 46 of the mobile client 34 includes icons 422 and 424 showing types of controls available for the camera. The icons 422 and 424 are provided as semi-transparent symbols on the video display. The icon 422 is shows a finger tapping concentric circles to indicate a re-centering function availability. The icon 424 shows a finger between oppositely directed arrows, indicating touch control of camera direction. The controls are abstracted from the interface of a pan, tilt, zoom (PTZ) controller that in response to the inquiry "what do you support" in an asynchronous manner. Some objects already know what control types they support and respond immediately with a list of types of commands. Some objects do not know and respond immediately with a response of "none" and then a dynamic query of the camera or video server is performed to determine which control modes they support. A notification is triggered to the interested parties with the updated information. Based on the control modes the PTZ controller reports, a display of appropriate user icons is provided so the user knows the available modes of operation, here shown as dragging a finger to position, double tapping to re-center.

Text 426 across the top of the display in FIG. 24 is from the camera, and may vary depending on the camera source and the settings applied to the camera.

The video command application may be provided in different configurations for different operational platforms and/or that include different sets of options and functionality.

According to embodiments of the present method, camera configurations are pulled down from the cloud/server account, i.e. from the network. The user enters access credentials which are then authenticated. Camera and group definitions specific to the authenticated user are delivered over an encrypted data channel using SSL. The data itself is also encrypted using a symmetric AES 256 bit key for a second layer of data protection. The camera configurations can be delivered to a mobile device or a web or GUI client interface. The configurations can be dynamically changed through periodic background server communications to look for camera or group changes for the specific user. Camera configurations can be cached locally in the mobile device or GUI client so the user will have faster access to the cameras while the application talks to the server in the background. Whether a user is allowed to cache configurations is set in the server on a per user basis. Camera access can be granted or quickly removed at the server. If a user's password is changed on the server, their camera configurations are automatically removed from the mobile or other GUI.

Collection and display of actual frame and data rates on video feeds may be performed according to embodiments of the present invention. Each video transport (whether in a single full screen video view or a multi-video display) includes data and frame rate counters that are updated with every data packet received. A frame rate and data rate average is displayed on each video frame. The display of the counters can be turned on and off by the user Another feature of the apparatus and method is automatic camera discovery on a local LAN network. Cameras are configured to broadcast their configuration information on the local network using Bonjour software (also known as ZeroConf). Mobile devices listen for announcements of cameras on their local network and automatically obtain camera configuration information. Automatically detected cameras are added to a dynamic group containing all detected cameras. The user may use the detected cameras as a group or add them to a user defined group.

Real time synthesis of motion jpeg video feeds is provided from still images, including those scraped from video management servers or recorded stills. A gateway server is configured to gather individual video frames from some video source (for example, from a video server or recorded stills stored in a file system). These frames are stitched together and presented to a client as a standard (server push) Motion JPEG video stream.

The video command application provides detection of piracy via encryption stripped from an iPhone application. At application load time, the application reads it's own binary file and verifies that it is still properly encrypted. This indicates a legal copy of the application. The results of this check are reported to a compliance manager module.

A user configurable video connection timeout function is provided. The user uses this function to set the desired connection timeout for video feeds. This allows the user to adjust behavior for optimal results in various types of networks.

Scrubbing through historical video is provided with a single finger operation on the mobile client. A single or multiple video feed rewind (also referred to as a scrubbing multiview) is provided. The user chooses to view historical (recorded) video. A sliding control is presented to allow the user to navigate to any time frame in the recorded range. The user can either review recordings for a single video feed, or for multiple video feeds simultaneously in a synchronized fashion.

Thus, there is shown and described a video display and control method and apparatus that permits users of mobile devices to simultaneously view multiple video data streams, group video data streams according to user defined groups, flip through groups of video data streams, and to select video streams for a larger view. Image capture from the video data is provided including marking of the captured images. Control of the camera source of the video data is provided for the mobile device user, such as by manipulation of a multi-touch sensitive screen, to pan, tilt or zoom the camera. Activation of video data streams and groups of video data streams for display on the mobile device is provided by secure transfer of activation information to the mobile device via email. Notification of events monitored by the video source or by other sensors is sent to users of the mobile devices.

Although other modifications and changes may be suggested by those skilled in the art, it is the intention of the inventors to embody within the patent warranted hereon all changes and modifications as reasonably and properly come within the scope of their contribution to the art.

We claim:

1. An apparatus for display and control of video data, comprising; a mobile client device having a touch sensitive display, said mobile client device being operable to connect to a wireless network and receive video data from a plurality of video sources over the wireless network; and non-transitory computer readable storage media in said mobile client device having stored thereon a video command application, said video command application being operable to simultaneously display on said touch sensitive display at least a portion of the video data from a predetermined number of said plurality of video sources, said plurality of video sources exceeding said predetermined number of displayed video sources, wherein said plurality of video sources that are not currently displayed on said touch sensitive display are off-screen video sources that are periodically updated with current video data, said video command application being operable to simultaneously display video data from multiple video sources having multiple differing video formats, said video command application being operable to display video data from a single video source on said touch sensitive display, and said video command application being operable to generate command instructions from user contact with said touch sensitive display to change a characteristic of said single video source, and thereby change the video data being generated by the video source, in accordance with the user contact.

2. The apparatus of claim 1, wherein said single video source is a video camera and said video data includes live video images generated by said video camera.

3. An apparatus as claimed in claim 2, wherein said characteristic is at least one of camera direction, camera elevation, or camera zoom level.

4. The apparatus of claim 3, wherein said touch sensitive display is a multi-touch sensitive display, and wherein double-tap contact with said multi-touch sensitive display, at a location in said displayed video data, triggers said video command application to generate a re-center command transmitted to the single video source to cause the single video source to re-center the displayed video data at the location of the video data that was double-tapped on the multi-touch sensitive display.

5. The apparatus of claim 2, wherein said touch sensitive display is a multi-touch sensitive display, and wherein contacting said multi-touch display at two separate locations and increasing the distance between said contact locations while maintaining contact with said display triggers said video command application to generate a zoom-in command instruction transmitted to said video camera to cause said video camera to zoom-in to a location in the camera's view centered between said contact locations.

6. The apparatus of claim 2, wherein said touch sensitive display is a multi-touch sensitive display, and wherein contacting said multi-touch display at two separate locations and decreasing the distance between said contact locations while maintaining contact with said display triggers said video command application to generate a zoom-out command instruction transmitted to said video camera to cause said video camera to zoom-out at as location in the camera's view centered between said contact locations.

7. The apparatus of claim 2, wherein said touch sensitive display is a multi-touch sensitive display, and wherein tapping said multi-touch display with two points of contact at a first location triggers said video command application to generate a zoom-in command instruction transmitted to said video camera to cause said video camera to zoom-in a pre-set zoom level for each time said first location is contacted by the two points of contact, and wherein tapping said multi-touch display with two points of contact at a second location triggers said video command application to generate a zoom-out command instruction transmitted to said video camera to cause said video source to zoom-out the pre-set zoom level for each time said second location is contacted by the two points of contact.

8. The apparatus of claim 7, wherein said first location is an area located at an upper end of said multi-touch display screen and said second location is an area located at a lower end of said multi-touch display screen.

9. The apparatus of claim 2, wherein said user contact is a dragging movement on said displayed video image on said touch-sensitive display, said dragging movement having a drag direction, and wherein said dragging movement triggers said video command application to generate a command to cause a said video camera to move in the direction of drag relative to the displayed video image.

10. The apparatus of claim 9, wherein said camera movement continues in the direction of dragging movement until said dragging movement terminates.

11. The apparatus of claim 9, wherein an icon is generated on said touch sensitive display at a last location of said user contact with said display in response to said dragging movement, and wherein said camera movement continues until user contact with said icon terminates.

12. The apparatus of claim 1, wherein said mobile client device is a first mobile client device, and further comprising:

a further mobile client device having a touch sensitive display and being operable to connect to a wireless network over which is available video data, said further mobile client device being operable to transmit video source configuration information to said first mobile client device; and said first mobile client device being operable to receive the video source configuration information and to display video data of the video source corresponding to the transmitted video source configuration information.

13. The apparatus of claim 1, wherein said video command application is operable to display on said touch sensitive display at least one of a real-time frame rate and data rate of the video data for each of the plurality of video sources having video data displayed on said touch sensitive display.

14. The apparatus of claim 1, wherein said video data includes recorded video images, and wherein said video command application is operable to permit control of playback said recorded video images by user contact with said touch sensitive display.

15. An apparatus for display and control of video data, comprising: a mobile client device having a touch sensitive display, said mobile client device being operable to connect to a wireless network, and receive video data from a plurality of video sources over the wireless network; and non-transitory computer readable storage media in said mobile client device having stored thereon a video command application, said video command application being operable to simultaneously display on said touch of said plurality of video sources, said plurality of video sources exceeding said predetermined number of displayed video sources, wherein said plurality of video sources that are not currently displayed on said touch sensitive display are off-screen video sources that are periodically updated with current video data, said video command application being operable to simultaneously display video data from multiple video sources having multiple differing video formats, said video command application being operable to display video data from a single video source on said touch sensitive display, and said video command application being operable to generate command instructions from user contact with said touch sensitive display to change a characteristic of said single video source, and thereby change the video data being generated by the video source, in accordance with the user contact;

wherein said video command application is operable to monitor a latency of said wireless network to which said mobile client device is connected, and send a command to at least one of said plurality of video sources to reduce the network bandwidth usage by the video sources, thereby reducing the latency of said network connection, if the latency exceeds a predetermined threshold.

16. The apparatus of claim 15, wherein said video data includes at least video images, and wherein said video command application is operable to permit a user to pause, rewind, or fast forward the video images from said single displayed video source, and generate a command to pause, fast forward, or rewind said video images of said off-screen video sources simultaneously and in a time synchronized fashion with said paused, rewound, or fast-forwarded single displayed video source.

17. The apparatus of claim 15, wherein said video command application groups said plurality of video sources into a plurality of groups, said simultaneous display displaying only video data of a single group.

18. The apparatus of claim 17, wherein said video data includes at least video images, and wherein said video command application is operable to permit a user to pause, rewind, or fast forward the video images from a first displayed video sources in said displayed single group and, and generate a command to pause, fast forward, or rewind said video images of said remaining video sources in said displayed single group simultaneously and in a time synchronized fashion with said paused, rewound, or fast-forwarded first displayed video source.

19. The apparatus of claim 17, wherein said video command application is operable to flip pages of video data in a group, and wherein said video command application updates non-displayed video fields of the group on a periodic basis.

20. A method of displaying and controlling video data on a mobile client device, comprising the steps of:

receiving video data, including at least a video feed, over a network connection from a plurality of video sources;

displaying the video data, as a simultaneous display of a plurality of video fields on a display panel of the mobile client device;

controlling directional movement and video feed rewind of at least one of the plurality of video sources in response to touch contact of the display panel by a user;

monitoring latency over the network connection, said monitoring being performed by at least one of the mobile client device or a server; and transmitting a command from at least one of the mobile client device or the server to a video source to reduce data volume of video data carried over the network if the latency exceeds a predetermined threshold, wherein said command to reduce data volume includes at least one of: reduce resolution of the video signal., increase compression of the video signal, and reduce frame rate of the video signal.

21. The apparatus of claim 20, further comprising the steps of; sensing a predetermined condition at a location; generating a real time alert associated with the predetermined condition; transmitting the real time alert to a user of a mobile client device;

transmitting video source configuration information to the mobile client device, the video source configuration information being for video sources providing video data at the location;

activating a video field on the mobile client device for the video source at the location; and displaying the video data of the location on the mobile client device.

* * * * *